(12) United States Patent
Sato et al.

(10) Patent No.: US 12,523,255 B2
(45) Date of Patent: Jan. 13, 2026

(54) ROLLING MEMBER AND ROLLING BEARING

(71) Applicant: NTN Corporation, Osaka (JP)

(72) Inventors: Miyu Sato, Kuwana (JP); Noriaki Miwa, Kuwana (JP); Masahiro Yamada, Kuwana (JP); Chikara Ohki, Kuwana (JP)

(73) Assignee: NTN Corporation, Osaka (JP)

( * ) Notice: Subject to any disclaimer, the term of this patent is extended or adjusted under 35 U.S.C. 154(b) by 447 days.

(21) Appl. No.: 18/034,017

(22) PCT Filed: Oct. 28, 2021

(86) PCT No.: PCT/JP2021/039842
§ 371 (c)(1),
(2) Date: Apr. 26, 2023

(87) PCT Pub. No.: WO2022/092210
PCT Pub. Date: May 5, 2022

(65) Prior Publication Data
US 2023/0383790 A1    Nov. 30, 2023

(30) Foreign Application Priority Data

Oct. 30, 2020  (JP) .................. 2020-182764
Jan. 12, 2021  (JP) .................. 2021-002702
(Continued)

(51) Int. Cl.
*F16C 33/62*    (2006.01)
*C21D 1/18*    (2006.01)
(Continued)

(52) U.S. Cl.
CPC ............ *F16C 33/62* (2013.01); *C21D 1/18* (2013.01); *C21D 1/74* (2013.01); *C21D 6/002* (2013.01);
(Continued)

(58) Field of Classification Search
CPC .. F16C 33/62; F16C 2204/66; F16C 2223/14; F16C 2223/16; F16C 19/52; F16C 33/32;
(Continued)

(56) References Cited

U.S. PATENT DOCUMENTS 6,342,109 B1   1/2002  Takemura et al.
2003/0123770 A1   7/2003  Fujita et al.
(Continued)

FOREIGN PATENT DOCUMENTS

CN   104718305 A   6/2015
CN   105264247 A   1/2016
(Continued)

OTHER PUBLICATIONS

International Search Report issued in International Application No. PCT/JP2021/039842 dated Jan. 11, 2022, with English translation.

*Primary Examiner* — Adil A. Siddiqui
(74) *Attorney, Agent, or Firm* — Rimon P.C.

(57) ABSTRACT

A rolling member is formed of quenched steel having a contact surface. The rolling member includes a superficial part in a region up to a depth of 20 μm from the contact surface. Steel contains greater than or equal to 0.70 mass % and less than or equal to 1.10 mass % of carbon, greater than or equal to 0.15 mass % and less than or equal to 0.35 mass % of silicon, greater than or equal to 0.30 mass % and less than or equal to 0.60 mass % of manganese, greater than or equal to 1.30 mass % and less than or equal to 1.60 mass % of chromium, greater than or equal to 0.01 mass % and less than or equal to 0.50 mass % of molybdenum, and greater (Continued)

than or equal to 0.01 mass % and less than or equal to 0.50 mass % of vanadium, and the remainder of iron and inevitable impurities.

19 Claims, 20 Drawing Sheets

(30) Foreign Application Priority Data

| Jan. 12, 2021 | (JP) | 2021-002706 |
| Jan. 12, 2021 | (JP) | 2021-002707 |
| Apr. 26, 2021 | (JP) | 2021-074027 |
| Apr. 26, 2021 | (JP) | 2021-074030 |

(51) Int. Cl.
| C21D 1/74 | (2006.01) |
| C21D 6/00 | (2006.01) |
| C21D 9/40 | (2006.01) |
| C22C 38/02 | (2006.01) |
| C22C 38/04 | (2006.01) |
| C22C 38/22 | (2006.01) |
| C22C 38/24 | (2006.01) |
| C23C 8/26 | (2006.01) |

(52) U.S. Cl.
CPC ............. *C21D 6/005* (2013.01); *C21D 6/008* (2013.01); *C21D 9/40* (2013.01); *C22C 38/02* (2013.01); *C22C 38/04* (2013.01); *C22C 38/22* (2013.01); *C22C 38/24* (2013.01); *C21D 2211/001* (2013.01); *C21D 2261/00* (2013.01); *C23C 8/26* (2013.01); *F16C 2204/66* (2013.01)

(58) Field of Classification Search
CPC .......... F16C 33/64; F16C 19/06; F16C 19/10; C21D 1/18; C21D 1/74; C21D 6/002; C21D 6/005; C21D 6/008; C21D 9/40; C21D 2211/001; C21D 2261/00; C21D 1/26; C21D 1/06; C21D 1/76; C21D 2201/05; C22C 38/02; C22C 38/04; C22C 38/22; C22C 38/24; C23C 8/26; C23C 8/02; C23C 8/30; C23C 8/32; C23C 8/80

See application file for complete search history.

(56) References Cited

U.S. PATENT DOCUMENTS

| 2012/0020605 A1 | 1/2012 | Mori |
| 2016/0131188 A1 | 5/2016 | Sato et al. |
| 2016/0178009 A1 | 6/2016 | Sato et al. |
| 2017/0167538 A1* | 6/2017 | Sada ................. F16C 33/62 |
| 2020/0003259 A1 | 1/2020 | Yamada et al. |
| 2020/0378442 A1 | 12/2020 | Yamada et al. |

FOREIGN PATENT DOCUMENTS

| CN | 107013567 A | 8/2017 |
| JP | 2000-213549 A | 8/2000 |
| JP | 2000-282178 A | 10/2000 |
| JP | 3873741 B2 | 1/2001 |
| JP | 2007-100126 A | 4/2007 |
| JP | 2012-237338 A | 12/2012 |
| JP | 5372316 B2 | 12/2013 |
| JP | 5489111 B2 | 5/2014 |
| JP | 2014-152378 A | 8/2014 |
| JP | 6023422 B2 | 11/2016 |
| JP | 2017-166525 A | 9/2017 |
| JP | 2019-108576 A | 7/2019 |
| JP | 2019-167551 A | 10/2019 |
| JP | 2020-29615 A | 2/2020 |
| WO | 2013/156091 A1 | 10/2013 |

* cited by examiner

ROLLING MEMBER AND ROLLING BEARING

CROSS-REFERENCE OF RELATED APPLICATIONS

This application is the U.S. National Phase under 35 U.S.C. § 371 of International Patent Application No. PCT/JP2021/039842, filed on Oct. 28, 2021, which in turn claims the benefit of Japanese Patent Application No. 2020-182764, filed on Oct. 30, 2020, Japanese Patent Application No. 2021-002702, filed Jan. 12, 2021, Japanese Patent Application No. 2021-002706, filed Jan. 12, 2021, Japanese Patent Application No. 2021-002707, filed Jan. 12, 2021, Japanese Patent Application No. 2021-074027, filed Apr. 26, 2021, and Japanese Patent Application No. 2021-074030, filed Apr. 26, 2021, the entire disclosures of which Applications are incorporated by reference herein.

TECHNICAL FIELD

The present invention relates to a rolling member and a rolling bearing.

BACKGROUND ART

Conventionally, rolling members such as a raceway ring and a rolling element of a rolling bearing have been formed of high-carbon chromium bearing steel (SUJ2, SUJ3 and so on) defined in JIS standard (JIS G 4805:2008). Also, in order to improve the durability in the surface of rolling members, superficial parts have been undergone a nitriding treatment.

In recent years, use environments of rolling bearings are becoming more severe. Therefore, it is sometimes the case that sufficient durability is not obtained only by forming a rolling member of a common steel material such as SUJ2, SUJ3 or the like, and subjecting the superficial part to a nitriding treatment.

In rolling bearings described in PTL 1 (U.S. Pat. No. 3,873,741) and PTL 2 (U.S. Pat. No. 5,372,316), an attempt is made to improve the abrasion resistance and the seizure resistance under the environment accompanying a sliding contact, and under the environment where lubricating oil is exhausted by forming a rolling member of a steel material to which a large quantity of silicon (Si) or manganese (Mn) is added.

In a rolling bearing described in PTL 3 (Japanese Patent Laying-Open No. 2000-282178), penetration of hydrogen into steel is prevented by adding a large quantity of chromium (Cr) to the steel material for use in the rolling member and forming a passive state film on the surface.

CITATION LIST

Patent Literature

PTL 1: U.S. Pat. No. 3,873,741
PTL 2: U.S. Pat. No. 5,372,316
PTL 3 Japanese Patent Laying-Open No. 2000-282178

SUMMARY OF INVENTION

Technical Problem

However, in consideration of recent demands for improvement in durability of rolling members, durability of rolling members can be insufficient depending on the application in rolling bearings described in PTL 1 to PTL 3.

For example, in the rolling bearing according to PTL 3, carbide in steel can become coarse by addition of chromium to the steel material. The coarse carbide can become a stress concentration source, and can become an origin of early flaking.

While the passive state film has the effect of preventing dispersion of hydrogen into steel, it also has the effect of promoting adsorption of hydrogen. When the rolling bearing according to PTL 3 is used intermittently, hydrogen is dissipated at the time of stoppage, so that delaying the penetration of hydrogen into steel by a passive state film is effective for preventing early flaking. However, when the rolling bearing described in PTL 3 is used continuously, a lot of hydrogen is adsorbed by the passive state film, and the quantity of hydrogen penetrating into steel increases, resulting that early flaking is easy to occur.

In the future, rolling bearings that are continuously operated without human intervention are expected to increase, however, for such application, conventional rolling bearings including the rolling bearing described in PTL 3 are insufficient in durability.

The present invention was devised in light of the problems of the conventional art described above. More specifically, the present invention provides a rolling member and a rolling bearing capable of further elongating the life.

Solution to Problem

A rolling member according to one aspect of the present invention is formed of quenched steel having a contact surface. The rolling member includes a superficial part in a region up to a depth of 20 µm from the contact surface. Steel contains greater than or equal to 0.70 mass % and less than or equal to 1.10 mass % of carbon, greater than or equal to 0.15 mass % and less than or equal to 0.35 mass % of silicon, greater than or equal to 0.30 mass % and less than or equal to 0.60 mass % of manganese, greater than or equal to 1.30 mass % and less than or equal to 1.60 mass % of chromium, greater than or equal to 0.01 mass % and less than or equal to 0.50 mass % of molybdenum, and greater than or equal to 0.01 mass % and less than or equal to 0.50 mass % of vanadium, and the remainder of iron and inevitable impurities. A content of nitrogen in the superficial part is greater than or equal to 0.2 mass % and less than or equal to 0.8 mass %.

In the rolling member, steel may contain greater than or equal to 0.90 mass % and less than or equal to 1.10 mass % of carbon, greater than or equal to 0.20 mass % and less than or equal to 0.30 mass % of silicon, greater than or equal to 0.40 mass % and less than or equal to 0.50 mass % of manganese, greater than or equal to 1.40 mass % and less than or equal to 1.60 mass % of chromium, greater than or equal to 0.20 mass % and less than or equal to 0.30 mass % of molybdenum, and greater than or equal to 0.20 mass % and less than or equal to 0.30 mass % of vanadium, and the remainder of iron and inevitable impurities. A content of nitrogen in the superficial part may be greater than or equal to 0.3 mass % and less than or equal to 0.5 mass %.

In the above rolling member, in a sectional view orthogonal to the contact surface, a total of greater than or equal to 60 precipitates having a grain size of less than or equal to 0.50 µm exist per 100 µm² in the superficial part, and a total of area fractions of precipitates in the superficial part may be greater than or equal to 1% and less than or equal to 10%. A volume fraction of retained austenite quantity at a position of 50 μm deep from the contact surface may be greater than or equal to 20% and less than or equal to 40%. Hardness at a position of 50 μm deep from the contact surface may be greater than or equal to 653 Hv and less than or equal to 800 Hv.

In the above rolling member, in a sectional view orthogonal to the contact surface, a total of greater than or equal to 80 precipitates having a grain size of less than or equal to 0.50 μm exist per 100 μm$^2$ in the superficial part, and a total of area fractions of the precipitates in the superficial part may be greater than or equal to 2% and less than or equal to 7%. A volume fraction of retained austenite quantity at a position of 50 μm deep from the contact surface may be greater than or equal to 25% and less than or equal to 35%. Hardness at a position of 50 μm deep from the contact surface may be greater than or equal to 653 Hv and less than or equal to 800 Hv.

A rolling bearing according to one aspect of the present invention includes a raceway member, and a rolling element arranged in contact with the raceway member. At least either the raceway member or the rolling element is the aforementioned rolling member.

Advantageous Effects of Invention

According to the rolling member and the rolling bearing according to one aspect of the present invention, it becomes possible to elongate the life.

DESCRIPTION OF EMBODIMENTS

Figure 1:
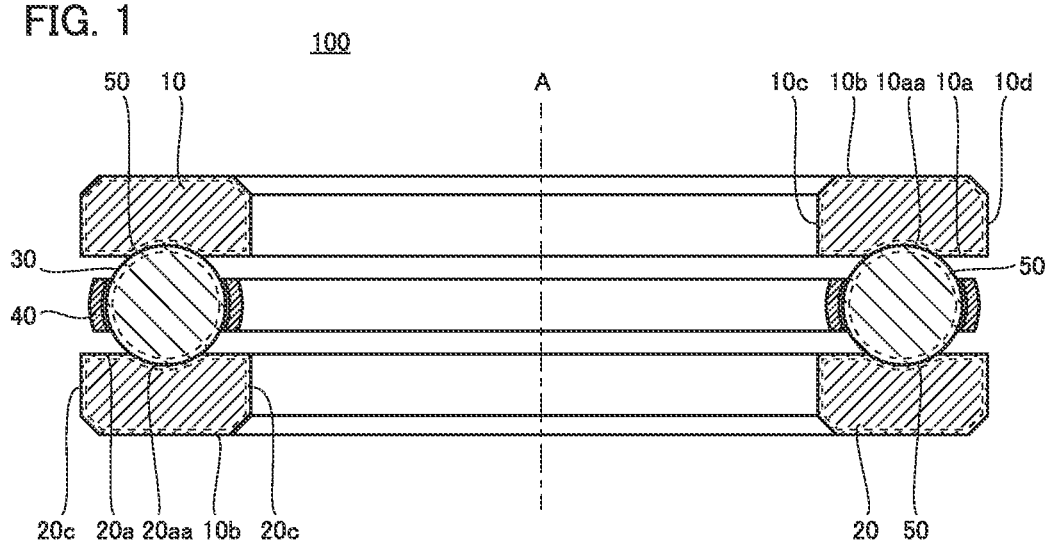
FIG. 1 is a sectional view of a rolling bearing 100.

The details of embodiments of the present invention are described by referring to drawings. In the following drawings, the same or the corresponding part is denoted by the same reference numeral and overlapping description is not repeated.

(Configuration of Rolling Bearing According to First Embodiment)

Hereinafter, configuration of a rolling bearing according to the first embodiment (hereinafter, referred to as "rolling bearing 100") is described. Rolling bearing 100 is, for example, a single-direction thrust ball bearing with flat seats. However, rolling bearing 100 is not limited to this.

Rolling bearing 100 is, for example, for use in a transaxle of vehicle (fuel cell vehicle, electric vehicle and the like), for use in a transmission (continuously variable transmission) of vehicle, or for use in a motor (for driving gear, for transmission) of vehicle. Rolling bearing 100 may be for use in a hydrogen pressure reducing valve of fuel cell vehicle or for use in a hydrogen circulator of fuel cell vehicle. Rolling bearing 100 may be for use in electrical equipment of vehicle or for use in an auxiliary machinery of vehicle (alternator, electromagnetic clutch of car air conditioner, fan coupling device, intermediate pulley, electric-powered fan motor, compressor and the like).

Rolling bearing 100 may be a hub bearing. Rolling bearing 100 may be for use in a machine tool (for main shaft), for use in a wind turbine generator (for speed increasing gear), for use in a railway vehicle (for vehicle shaft, for driving gear, for main motor, etc.), for use in a construction machinery (for axle etc.), for use in a paper machine, or for use in a transmission. However, use application of rolling bearing 100 is not limited to these.

FIG. 1 is a sectional view of rolling bearing 100. As shown in FIG. 1, rolling bearing 100 has a central axis A. FIG. 1 shows a sectional view of rolling bearing 100 in a cross section along a central axis A. Rolling bearing 100 has a raceway member (raceway ring or washer), and a rolling element. In rolling bearing 100, the raceway member is an inner ring (shaft washer) 10 and an outer ring (housing washer) 20, and the rolling element is a ball 30. Rolling bearing 100 further has a retainer 40.

Inner ring 10 has an annular (ring-like) shape. Inner ring 10 has a first face 10a, a second face 10b, an inner circumferential face 10c, and an outer circumferential face 10d.

First face 10a and second face 10b constitute end faces in the direction along central axis A (hereinafter, referred to as "axial direction"). Second face 10b is the opposite face of first face 10a in the axial direction. First face 10a has a raceway surface 10aa. First face 10a is recessed toward second face 10b in raceway surface 10aa. In the sectional view, raceway surface 10aa has a partially arc shape. Raceway surface 10aa is a surface that comes into contact with ball 30, and constitutes a contact surface of inner ring 10.

Inner circumferential face 10c is a surface facing to central axis A side. Inner circumferential face 10c connects at one end in the axial direction with first face 10a, and connects at the other end in the axial direction with second face 10b.

Outer circumferential face 10d is a surface facing to the side opposite to central axis A. That is, outer circumferential face 10d is an opposite surface of inner circumferential face 10c in the direction orthogonal to central axis A (hereinafter, referred to as "radial direction"). Outer circumferential face 10d connects at one end in the axial direction with first face 10a, and connects at the other end in the axial direction with second face 10b.

Outer ring 20 has a ring-like shape. Outer ring 20 has a first face 20a, a second face 20b, an inner circumferential face 20c and an outer circumferential face 20d.

First face 20a and second face 20b constitute end faces in the axial direction. Outer ring 20 is arranged such that first face 20a faces with first face 10a. Second face 20b is the Retainer 40 retains ball 30. Retainer 40 retains ball 30 such that an interval of two neighboring balls 30 falls within a certain range in the direction along the circumference about central axis A (hereinafter, referred to as "circumferential direction").

<Steel Used in Raceway Member and Rolling Element>

Inner ring 10, outer ring 20 and ball 30 are formed of steel having a composition shown in Table 1 (hereinafter, referred to as "first composition"). Inner ring 10, outer ring 20 and ball 30 may be formed of steel having a composition shown in Table 2 (hereinafter, referred to as "second composition"). Steel that forms inner ring 10, outer ring 20 and ball 30 is quenched. It is only required that at least one of inner ring 10, outer ring 20 or ball 30 is formed of steel of the first composition (second composition).

TABLE 1

| C | Si | Mn | Cr | Mo | V | Remainder |
|---|----|----|----|----|----|-----------|
| Greater than or equal to 0.70 and less than or equal to 1.10 | Greater than or equal to 0.15 and less than or equal to 0.35 | Greater than or equal to 0.30 and less than or equal to 0.60 | Greater than or equal to 1.30 and less than or equal to 1.60 | Greater than or equal to 0.01 and less than or equal to 0.50 | Greater than or equal to 0.01 and less than or equal to 0.50 | Fe and inevitable impurity |

Unit: mass %

TABLE 2

| C | Si | Mn | Cr | Mo | V | Remainder |
|---|----|----|----|----|----|-----------|
| Greater than or equal to 0.90 and less than or equal to 1.10 | Greater than or equal to 0.20 and less than or equal to 0.30 | Greater than or equal to 0.40 and less than or equal to 0.50 | Greater than or equal to 1.40 and less than or equal to 1.60 | Greater than or equal to 0.20 and less than or equal to 0.30 | Greater than or equal to 0.20 and less than or equal to 0.30 | Fe and inevitable impurity |

Unit: mass % opposite face of first face 20a in the axial direction. First face 20a has a raceway surface 20aa. First face 20a is recessed toward second face 20b in raceway surface 20aa. In the sectional view, raceway surface 20aa has a partially arc shape. Raceway surface 20aa is a surface that comes into contact with ball 30, and constitutes a contact surface of outer ring 20.

Inner circumferential face 20c is a surface facing to central axis A side. Inner circumferential face 20c connects at one end in the axial direction with first face 20a, and connects at the other end in the axial direction with second face 20b.

Outer circumferential face 20d is a surface facing to the side opposite to central axis A. That is, outer circumferential face 20d is an opposite surface of inner circumferential face 20c in the direction orthogonal to central axis A (hereinafter, referred to as "radial direction"). Outer circumferential face 20d connects at one end in the axial direction with first face 20a, and connects at the other end in the axial direction with second face 20b.

Ball 30 has a globular shape. There are a plurality of balls 30. Ball 30 is arranged between first face 10a and first face 20a. More specifically, ball 30 is arranged between raceway surface 10aa and raceway surface 20aa. Ball 30 comes into contact with raceway surface 10aa and raceway surface 20aa on the surface of ball 30. That is, the surface of ball 30 is a contact surface.

Carbon (C) influences on the hardness of the contact surface (raceway surface 10aa, raceway surface 20aa and surface of ball 30) after quenching. If the content of carbon in steel is less than 0.70 mass %, it is difficult to secure sufficient hardness in the contact surface. Also, if the content of carbon in steel is less than 0.70 mass %, it is necessary to supplement the carbon content in the surface by a carburizing treatment or the like. This results in deterioration in production efficiency and increase in production cost. If the content of carbon in steel is greater than 1.10 mass %, a crack at the time of quenching (quenching crack) can be generated. Therefore, in the steel of the first composition, the content of carbon is set to be greater than or equal to 0.70 mass % and less than or equal to 1.10 mass %.

Silicon is added for deoxidation at the time of refining of steel and securement of workability before a nitriding treatment. If the content of silicon in steel is less than 0.15 mass %, resistance to temper softening is insufficient. As a result, hardness of the contact surface can deteriorate due to temperature rise at the time of tempering after quenching or during use of rolling bearing 100. If the content of silicon in steel is greater than 0.35 mass %, the steel is too hard, and the tool life of the cutting tool used in machining inner ring 10 (outer ring 20, ball 30) can be shortened. Also, in this case, the material cost of steel increases. Therefore, in the steel of the first composition, the content of silicon is set to be greater than or equal to 0.15 mass % and less than or equal to 0.35 mass %.

Manganese is added to secure the hardenability and hardness of steel. If the content of manganese in steel is less than 0.30 mass %, it is difficult to secure the hardenability and the hardness of steel. If the content of manganese in steel is greater than 0.60 mass %, the steel is too hard, and the tool life of the cutting tool used in machining inner ring 10 (outer ring 20, ball 30) can be shortened. Also, in this case, the material cost of steel increases. Therefore, in the steel of the first composition, the content of manganese is set to be greater than or equal to 0.30 mass % and less than or equal to 0.60 mass %.

Chromium is added to secure the hardenability of steel, and to secure the hardness by forming fine precipitates in association with a nitriding treatment. If the content of chromium in steel is less than 1.30 mass %, it is difficult to secure the hardenability and the hardness of steel. If the content of chromium in steel is greater than 1.60 mass %, precipitates become coarse, and can be an origin of a fatigue failure. Also, in this case, the material cost of steel increases. Therefore, in the steel of the first composition, the content of chromium is set to be greater than or equal to 1.30 mass % and less than or equal to 1.60 mass %.

Molybdenum is added to secure the hardenability of steel, and to secure the hardness by forming fine precipitates in association with a nitriding treatment. Since molybdenum has strong affinity with carbon, it precipitates as undissolved carbide in steel at the time of a nitriding treatment. Since the undissolved carbide of molybdenum serves as a precipitation core at the time of quenching, molybdenum increases the quantity of precipitates after quenching.

If the content of molybdenum in steel is less than 0.01 mass %, it is difficult to secure the hardenability and the hardness of steel. If the content of molybdenum in steel is greater than 0.50 mass %, precipitates become coarse, and can be an origin of a fatigue failure. In this case, the material cost of steel also increases. Therefore, in the steel of the first composition, the content of molybdenum is set to be greater than or equal to 0.01 mass % and less than or equal to 0.50 mass %.

Vanadium is added to secure the hardenability of steel, and to secure the hardness by forming fine precipitates in association with a nitriding treatment. If the content of vanadium in steel is less than 0.01 mass %, it is difficult to secure the hardenability and the hardness of steel. If the content of vanadium in steel is greater than 0.50 mass %, precipitates become coarse, and can be an origin of a fatigue failure. In this case, the material cost of steel also increases. Therefore, in the steel of the first composition, the content of vanadium is set to be greater than or equal to 0.01 mass % and less than or equal to 0.50 mass %.

<Superficial Part 50>

As shown in FIG. 1, inner ring 10, outer ring 20 and ball 30 have a superficial part 50 in their surfaces. Superficial part 50 is a region up to a depth of 20 µm from the surface of inner ring 10, outer ring 20 and ball 30. It is only required that superficial part 50 is formed in the contact surface of at least inner ring 10, outer ring 20 and ball 30. Also, it is only required that superficial part 50 is formed in at least one of inner ring 10, outer ring 20 or ball 30.

Superficial part 50 is a part formed by a nitriding treatment. The content of nitrogen in superficial part 50 is greater than or equal to 0.2 mass % and less than or equal to 0.8 mass %. If the content of nitrogen in superficial part 50 is less than 0.2 mass %, it is difficult to secure the durability of the contact surface. If the content of nitrogen in superficial part 50 is greater than 0.8 mass %, the time required for the nitriding treatment elongates, and the production cost increases. Therefore, the content of nitrogen in superficial part 50 is set to be greater than or equal to 0.2 mass % and less than or equal to 0.8 mass %. It is preferred that the content of nitrogen in superficial part 50 is greater than or equal to 0.3 mass % and less than or equal to 0.5 mass %.

The content of nitrogen in superficial part 50 is measured by an electron probe micro analyzer (EPMA).

In the sectional view orthogonal to the contact surface, it is preferred that a total of greater than or equal to 60 precipitates having a grain size of less than or equal to 0.5 µm exist per 100 µm$^2$ in superficial part 50. In the sectional view orthogonal to the contact surface, it is further preferred that a total of greater than or equal to 80 precipitates having a grain size of less than or equal to 0.5 µm exist per 100 µm in superficial part 50.

In the sectional view orthogonal to the contact surface, it is preferred that a total of area fractions of precipitates in superficial part 50 is greater than or equal to 1% and less than or equal to 10%. In the sectional view orthogonal to the contact surface, it is further preferred that a total of area fractions of precipitates in superficial part 50 is greater than or equal to 2% and less than or equal to 7%.

Precipitates in superficial part 50 are, for example, carbonitrides and nitrides. Carbonitrides include carbides of iron, carbides of iron in which carbon is substituted by nitrogen, and carbides of iron in which iron is substituted by an alloy element other than iron. Nitrides are nitrides of iron. Precipitates in superficial part 50 may be carbides, carbonitrides or nitrides of an alloy element contained in steel.

Precipitates in steel of superficial part 50 may be nitride based on chromium or vanadium, or carbonitride based on chromium or vanadium.

Nitride based on chromium (vanadium) is nitride of chromium (vanadium) or nitrides of chromium (vanadium) in which part chromium (vanadium) sites is substituted by an alloy element other than chromium (vanadium).

Carbonitrides based on chromium (vanadium) are carbides of chromium (vanadium) in which part of carbon sites is substituted by nitrogen. A chromium (vanadium) site in carbonitride based on chromium (vanadium) may be substituted by an alloy element other than chromium (vanadium).

An area fraction of precipitate is calculated by acquiring a sectional image of superficial part 50 at a magnification of 5000 times using a Field Emission Scanning Electron Microscope (FE-SEM), binarizing the sectional image, and conducting an image processing for the binarized sectional image. The sectional image of superficial part 50 is acquired in greater than or equal to three fields of view, and the area fraction is an average value of the plurality of sectional images.

A grain size of each precipitate is obtained by acquiring an area of each precipitate in the same manner as described above, and multiplying a square root of the value obtained by dividing the acquired area by π, by 2.

<Retained Austenite Quantity in Steel>

It is preferred that a volume fraction of retained austenite in steel that forms inner ring 10, outer ring 20 and ball 30 is greater than or equal to 20% and less than or equal to 40% at a position of 50 µm deep from the contact surface. As a result, it is possible to improve the durability of the contact surface (especially, durability of the contact surface under a contaminated environment). If the volume fraction of retained austenite is less than 25%, the durability of the contact surface can be insufficient. If the volume fraction of retained austenite is greater than 35%, there is a fear for aged deterioration in association with decomposition of retained austenite.

It is further preferred that a volume ratio of retained austenite in steel that forms inner ring 10, outer ring 20 and ball 30 is greater than or equal to 25% and less than or equal to 35% at a position of 50 μm deep from the contact surface.

A retained austenite quantity in steel at a position of 50 μm deep from the contact surface is measured by an X-ray diffraction method. More specifically, a retained austenite quantity in steel at a position of 50 μm deep from the contact surface is measured by using an MSF-3M available from Rigaku Corporation.

<Hardness at Position where Depth from Contact Surface is to be 50 μm>

It is preferred that hardness at a position where the depth from the contact surface of inner ring 10, outer ring 20 and ball 30 is to be 50 μm is greater than or equal to 653 Hv and less than or equal to 800 Hv. If the hardness at a position where the depth from the contact surface is to be 50 μm is less than 653 Hv, durability of the contact surface can be insufficient. On the other hand, if hardness at a position where the depth from the contact surface is to be 50 μm is greater than 800 Iv, ductility and tenacity can deteriorate and early damage can be generated.

Hardness at a position where the depth from the contact surface of inner ring 10, outer ring 20 and ball 30 is to be 50 μm is measured by a Vickers hardness test method defined in JIS standard (JIS Z 2244:2009). The load at the time of measurement is set at 300 gf.

<Martensite Block in Superficial Part 50>

Steel of superficial part 50 has martensite block grains. Neighboring two martensite block grains have a difference in crystal orientation in the grain boundary of greater than or equal to 15°. From another perspective, even if there is a location where crystal orientation deviates, the location is not regarded as a crystal grain boundary of martensite block grains as long as the difference in crystal orientation is less than 15°. A grain boundary of martensite block grains is determined by an EBSD (Electron Back Scattered Diffraction) method.

In steel of superficial part 50, an average grain size of martensite block grains at a comparison area fraction of 30% is less than or equal to 2.0 μm. In steel of superficial part 50, it is preferred that an average grain size of martensite block grains at a comparison area fraction of 50% is less than or equal to 1.5 μm.

An average grain size of martensite block grains at a comparison area fraction of 30% (50%) is measured in the following method. First, in a cross section of inner ring 10 including superficial part 50, the cross section is observed. At this time, by the EBSD method, martensite block grains contained in the observation field are determined. This observation field is a region of 50 μm×35 μm. Second, from the crystal orientation data obtained by the EBSD method, respective areas of the martensite block grains contained in the observation field are analyzed.

Third, respective areas of the martensite block grains contained in the observation field are added up in descending order of area. The addition is performed until the 30% (50%) of the total area of the martensite block grains contained in the observation field is reached. For each of the martensite block grains that are objects of the addition, an equivalent circle diameter is calculated. The equivalent circle diameter is a square root of a value obtained by dividing the area of the martensite block grain by π/4. An average value of equivalent circle diameters of martensite block grains that are objects of the addition is regarded as an average grain size of martensite block grains at a comparison area fraction of 30% (50%).

(Method for Producing Rolling Bearing According to First Embodiment)

Hereinafter, a method for producing a rolling bearing is described.

Figure 2:
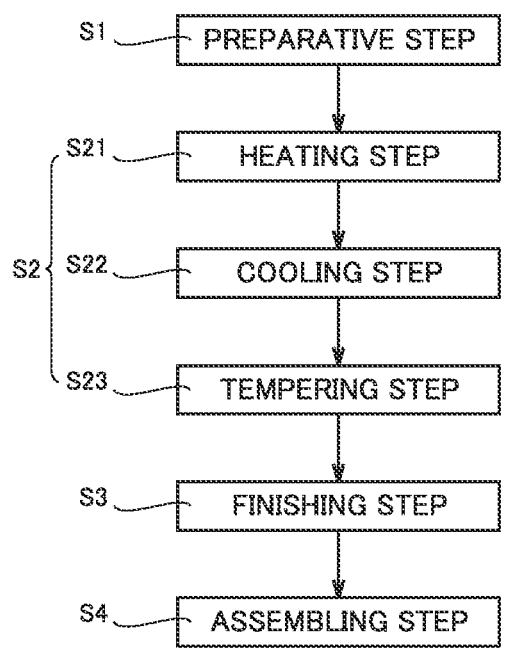
FIG. 2 is a process chart showing a method for producing rolling bearing 100.

FIG. 2 is a process chart showing a method for producing rolling bearing 100. As shown in FIG. 2, the method for producing rolling bearing 100 has a preparative step S1, a heat treatment step S2, a finishing step S3, and an assembling step S4. Heat treatment step S2 is conducted after preparative step S1 Finishing step S3 is conducted after heat treatment step S2. Assembling step S4 is conducted after finishing step S3.

In preparative step S1, a workpiece to be subjected to heat treatment step S2 and finishing step S3 is prepared. As the workpiece, a ring-shaped member is prepared when inner ring 10 and outer ring 20 are intended to be formed, and a globular member is prepared when ball 30 is intended to be formed. The workpiece is formed of steel having a first composition or a second composition.

Heat treatment step S2 has a heating step S21, a cooling step S22, and a tempering step S23. In heating step S21, the workpiece is retained at a temperature of greater than or equal to $A_1$ transformation point for a predetermined time. In heating step S21, a nitriding treatment for the workpiece is also conducted. The nitriding treatment is performed by conducting the heating and retaining in the atmospheric gas containing a gas that is a source of nitrogen (for example, ammonia gas).

Cooling step S22 is conducted after heating step S21. In cooling step S22, the workpiece is cooled to a temperature of less than or equal to Ms transformation point. The cooling is carried out, for example, by oil cooling. The tempering step S23 is conducted after cooling step S22. In tempering step S23, the workpiece is retained at a temperature of less than $A_1$ transformation point for a predetermined time.

In finishing step S3, finishing (grinding, polishing) and washing are conducted for the workpiece. In this manner, inner ring 10, outer ring 20 and ball 30 are prepared. In assembling step S4, inner ring 10, outer ring 20 and ball 30 are assembled together with retainer 40. Thus, rolling bearing 100 having the structure shown in FIG. 1 is produced.

(Effect of Rolling Bearing According to First Embodiment)

Hereinafter, an effect of rolling bearing 100 is described.

In rolling bearing 100, since superficial part 50 having subjected to a nitriding treatment is formed in the contact surface of inner ring 10, outer ring 20 and ball 30, a damage such as crack is difficult to be generated in the contact surface (and directly under the contact surface). Also, in rolling bearing 100, since inner ring 10, outer ring 20 and ball 30 are formed of steel having the first composition or the second composition, the hardness in the contact surface (and directly under the contact surface) can be secured, for example, by precipitation of fine precipitates in superficial part 50, and the precipitates can be prevented from becoming a stress concentration source (becoming an origin of generation of a crack).

In rolling bearing 100, since fine precipitates precipitate in superficial part 50, and the hardness of the contact surface is secured, formation of newly generated metal surface in the contact surface is prevented. Therefore, in rolling bearing 100, hydrogen is difficult to be generated in the contact surface. Also, in rolling bearing 100, a fine precipitate precipitates in superficial part 50, and the vicinity of the precipitate serves as a trap site of hydrogen, so that the hydrogen penetration quantity in superficial part 50 decreases. Therefore, in rolling bearing 100, an early flaking damage caused by hydrogen brittleness is difficult to occur. In this manner, according to rolling bearing 100, it is possible to elongate the life of the rolling bearing.

In steel of superficial part 50, when the martensite block grains are fined so that the average grain size at a comparison area fraction of 30% is less than or equal to 2.0 μm, the shear resistance of the contact surface (specifically, raceway surface 10da, raceway surface 20ca and surface of ball 30) is improved by increased toughness of the superficial part 50. Therefore, in this case, the durability of rolling bearing 100 can be further improved.

EXAMPLES

Hereinafter, Examples of rolling bearing 100 are described.
<Sample>
As samples of rolling bearing, a sample 1, a sample 2 and a sample 3 were prepared. Sample 1, sample 2 and sample 3 are single-direction thrust ball bearings of the model number 51106 in JIS standard having an inner diameter of 30 mm, an outer diameter of 47 mm and a width of 11 mm.

The inner ring and the outer ring of sample 1 were formed of steel having a composition shown in Table 3. The composition shown in Table 3 falls in the ranges of the first composition and the second composition. The inner ring and the outer ring of sample 2, and the inner ring and the outer ring of sample 3 were formed of steel having a composition shown in Table 4. The composition shown in Table 4 falls in the composition of SUJ2 defined in JIS standard, and falls outside the ranges of the first composition and the second composition. Balls of sample 1, sample 2 and sample 3 were formed of stainless steel (SUS440C).

TABLE 3

| C | Si | Mn | Cr | Mo | V | Remainder |
|---|----|----|----|----|---|-----------|
| 1.00 | 0.26 | 0.44 | 1.51 | 0.24 | 0.24 | Fe and inevitable impurity |

Unit: mass %

TABLE 4

| C | Si | Mn | Cr | Mo | V | Remainder |
|---|----|----|----|----|---|-----------|
| 0.99 | 0.26 | 0.44 | 1.51 | 0.00 | 0.00 | Fe and inevitable impurity |

Unit: mass % ring of sample 2 were subjected to heat treatment step S2. The inner ring and the outer ring of sample 3 are not subjected to heat treatment step S2. More specifically, for the inner ring and the outer ring of sample 3, quenching and tempering are conducted, however, nitriding treatment is not conducted.

Figure 3:
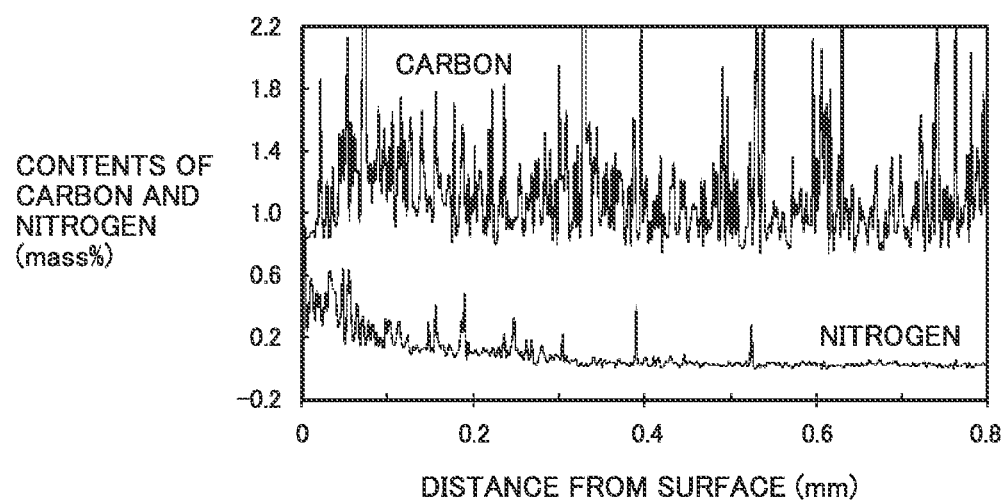
FIG. 3 is a graph showing distribution of contents of carbon and nitrogen in superficial parts of an inner ring and an outer ring of a sample 1.
Figure 4:
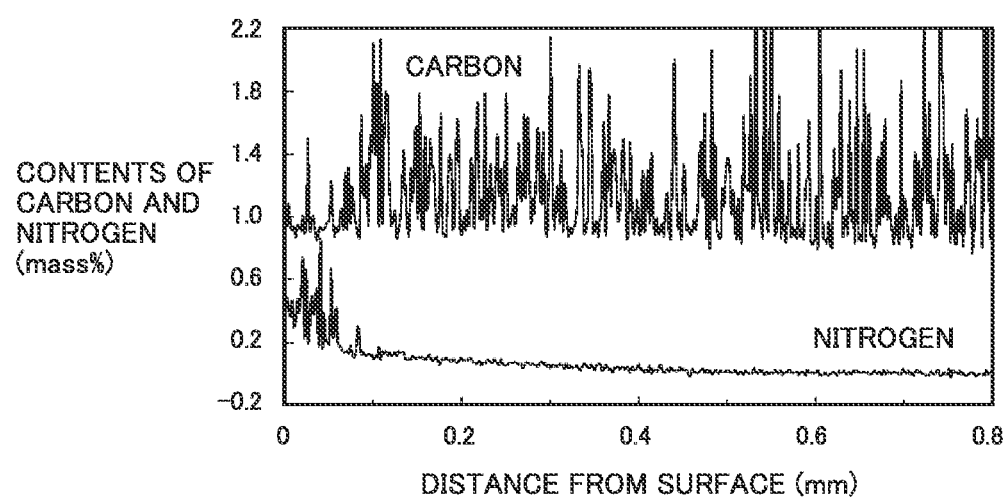
FIG. 4 is a graph showing distribution of contents of carbon and nitrogen in superficial parts of an inner ring and an outer ring of a sample 2.

FIG. 3 is a graph showing distribution of contents of carbon and nitrogen in superficial parts of the inner ring and the outer ring of sample 1. FIG. 4 is a graph showing distribution of contents of carbon and nitrogen in superficial parts of the inner ring and the outer ring of sample 2. In FIG. 3 and FIG. 4, the horizontal axis indicates a distance from the surface (unit: mm), and the vertical axis indicates contents of carbon and nitrogen (unit: mass %). As shown in FIG. 3, FIG. 4 and Table 5, contents of nitrogen in the superficial parts in the inner ring and the outer ring of sample 1 and in the inner ring and the outer ring of sample 2 were greater than or equal to 0.3 mass % and less than or equal to 0.5 mass %. On the other hand, as shown in Table 5, contents of nitrogen in the superficial parts in the inner ring and the outer ring of sample 3 were 0 mass % (nitrogen was not contained).

As shown in Table 5, in the superficial parts in the inner ring and the outer ring of sample 1, a total of area fractions of precipitates was greater than or equal to 2.2% and less than or equal to 7.0% In the superficial parts in the inner ring and the outer ring of sample 2, a total of area fractions of precipitates was greater than or equal to 1.2% and less than or equal to 4.0%. In the superficial parts in the inner ring and the outer ring of sample 3, a total of area fractions of precipitates was greater than or equal to 0.07% and less than or equal to 0.24%.

As shown in Table 5, in the superficial parts in the inner ring and the outer ring of sample 1, the number of precipitates was greater than or equal to 66 and less than or equal to 425 in total per 100 μm. In the superficial parts in the inner ring and the outer ring of sample 2, the number of precipitates was greater than or equal to 29 and less than or equal to 81 in total per 100 μm$^2$. In the superficial parts in the inner ring and the outer ring of sample 3, the number of precipitates was greater than or equal to 8 and less than or equal to 50 in total per 100 μm$^2$.

TABLE 5

| | Content of nitrogen in superficial part (mass %) | Area fraction of precipitate (%) | Number of precipitates per 100 μm$^2$ (number) |
|---|---|---|---|
| Inner ring and outer ring of sample 1 | Greater than or equal to 0.3 and less than or equal to 0.5 | Greater than or equal to 2.2 and less than or equal to 7.0 | Greater than or equal to 66 and less than or equal to 425 |
| Inner ring and outer ring of sample 2 | Greater than or equal to 0.3 and less than or equal to 0.5 | Greater than or equal to 1.2 and less than or equal to 4.0 | Greater than or equal to 29 and less than or equal to 81 |
| Inner ring and outer ring of sample 3 | 0 | Greater than or equal to 0.07 and less than or equal to 0.24 | Greater than or equal to 8 and less than or equal to 50 |

Figure 5:
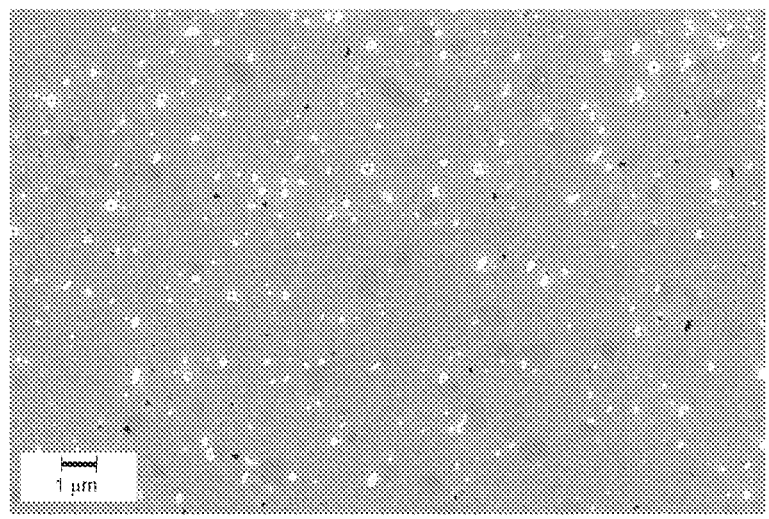
FIG. 5 is a representative sectional FE-SEM image in the superficial parts of the inner ring and the outer ring of sample 1.
Figure 6:
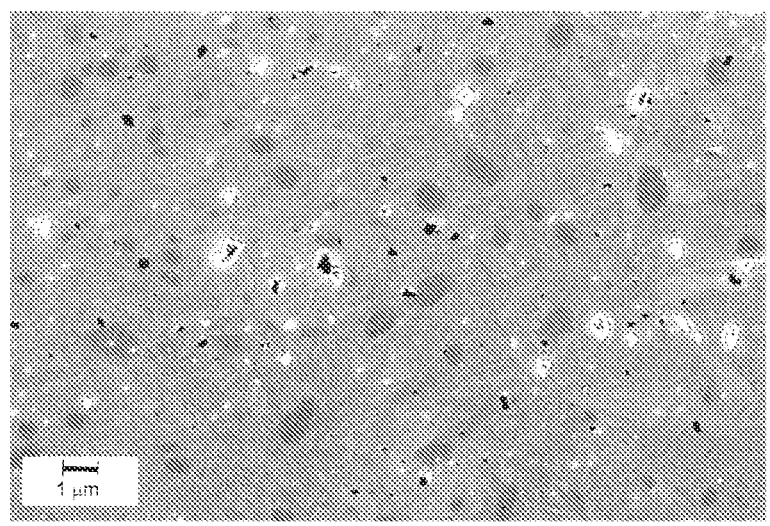
FIG. 6 is a representative sectional FE-SEM image in the superficial parts of the inner ring and the outer ring of sample 2.

FIG. 5 is a representative sectional FE-SEM image in the superficial parts of the inner ring and the outer ring of sample 1. FIG. 6 is a representative sectional FE-SEM image in the superficial parts of the inner ring and the outer ring of sample 2. As shown in FIG. 5, in the superficial parts of the inner ring and the outer ring of sample 1, precipitates were fined (most of precipitates had a grain size of less than or equal to 0.5 μm). On the other hand, as shown in FIG. 6, in the superficial parts of the inner ring and the outer ring of sample 2, precipitates were not fined (most of precipitates had a grain size of greater than 0.5 μm).

As shown in Table 6, a volume ratio of retained austenite at a position where the depth from the contact surface of the inner ring and the outer ring of sample 1 is to be 50 μm was greater than or equal to 29.8% and less than or equal to 30.8%. A volume ratio of retained austenite at a position where the depth from the contact surface of the inner ring and the outer ring of sample 2 is to be of 50 μm was greater than or equal to 30.2% and less than or equal to 31.4%. A volume ratio of retained austenite at a position where the depth from the contact surface of the inner ring and the outer ring of sample 3 is to be of 50 μm was greater than or equal to 9.7% and less than or equal to 11.5%.

As shown in Table 6, hardness at a position where the depth from the contact surface of the inner ring and the outer ring of sample 1 is to be 50 μm was greater than or equal to 755 Hv and less than or equal to 759 Hv. Hardness at a position where the depth from the contact surface of the inner ring and the outer ring of sample 2 is to be 50 μm was greater than or equal to 749 Hv and less than or equal to 758 Hv. Hardness at a position where the depth from the contact surface of the inner ring and the outer ring of sample 3 is to be 50 μm was greater than or equal to 735 Hv and less than or equal to 765 Hv.

TABLE 6

| | Volume fraction of retained austenite at position of 50 μm deep from contact surface (%) | Hardness at position of 50 μm deep from contact surface (Hv) |
| --- | --- | --- |
| Inner ring and outer ring of sample 1 | Greater than or equal to 29.8 and less than or equal to 30.8 | Greater than or equal to 755 and less than or equal to 759 |
| Inner ring and outer ring of sample 2 | Greater than or equal to 30.2 and less than or equal to 31.4 | Greater than or equal to 749 and less than or equal to 758 |
| Inner ring and outer ring of sample 3 | Greater than or equal to 9.7 and less than or equal to 11.5 | Greater than or equal to 735 and less than or equal to 765 |

<Rolling Fatigue Life Test>

A rolling fatigue life test was conducted for sample 1, sample 2 and sample 3. As shown in Table 7, the rolling fatigue life test was conducted under the conditions of a maximum contact surface pressure of 2.3 GPa, rapid acceleration and deceleration between 0 rpm (revolutions per minute) and 2500 rpm, and lubrication with a mixture of polyglycol and pure water.

Figure 7:
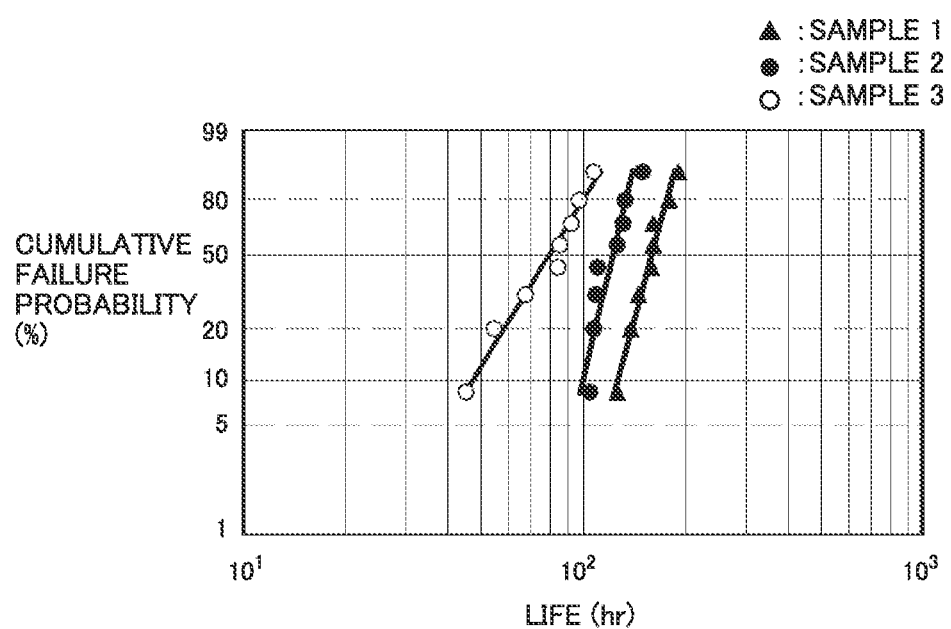
FIG. 7 is a graph showing a rolling fatigue life test result.

FIG. 7 is a graph showing a rolling fatigue life test result. In FIG. 7, the horizontal axis indicates life (unit: hr), and the vertical axis indicates cumulative failure probability (unit: %). As shown in FIG. 7 and Table 7, comparison in $L_{10}$ life (the time at which the cumulative failure probability reaches 10%) revealed that the rolling fatigue life of sample 2 was longer than the rolling fatigue life of sample 3. The comparison result experimentally demonstrated that the rolling fatigue life is improved by performing a nitriding treatment so that the content of nitrogen in superficial part 50 is greater than or equal to 0.2 mass % and less than or equal to 0.8 mass %.

As shown in FIG. 7 and Table 7, comparison in $L_{10}$ life revealed that the rolling fatigue life of sample 1 was longer than the rolling fatigue life of sample 2. The comparison result experimentally demonstrated that by forming at least one of inner ring 10, outer ring 20 or ball 30 of steel having the first composition, precipitates are finely dispersed in superficial part 50, and the rolling fatigue life is improved.

TABLE 7

| | $L_{10}$ life |
| --- | --- |
| Sample 1 | 2.7 times as compared with sample 3 |
| Sample 2 | 2.1 times as compared with sample 3 |

<Hydrogen Penetration Property>

Hydrogen penetration property into superficial parts of raceway members (inner ring and outer ring) of sample 1 and sample 3 was evaluated by the following method. In this evaluation, first, by heating raceway members of sample 1 and sample 3 before being subjected to the rolling fatigue life test to 400° C. from the room temperature, hydrogen release amounts from the raceway members of sample 1 and sample 3 before being subjected to the rolling fatigue life test were measured. Secondly, by heating raceway members of sample 1 and sample 3 after being subjected to the rolling fatigue life test for 50 hours to 400° C. from the room temperature, hydrogen release amounts from the raceway members of sample 1 and sample 3 after being subjected to the rolling fatigue life test for 50 hours were measured.

In sample 3, the ratio of hydrogen release amount before and after the rolling fatigue life test (namely, the value obtained by dividing the hydrogen release amount after being subjected to the rolling fatigue life test by the hydrogen release amount before being subjected to the rolling fatigue life test) was 3.2. On the other hand, in sample 1, the ratio of hydrogen release amount before and after the rolling fatigue life test was 0.9. This comparison experimentally revealed that by formation of superficial part 50 in the contact surface, penetration of hydrogen into superficial part 50 is prevented, and early flaking caused by hydrogen brittleness is prevented.

Second Embodiment

A bearing component according to the second embodiment is, for example, an inner ring 210 of a rolling bearing. Hereinafter, inner ring 210 is described as an example of a bearing component according to the second embodiment. However, the bearing component according to the second embodiment is not limited to this. The bearing component according to the second embodiment may be an outer ring of a rolling bearing or a rolling element of a rolling bearing.

(Configuration of Inner Ring 210)

Figure 8:
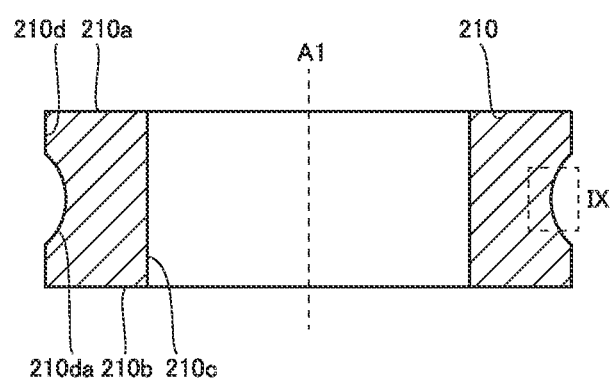
FIG. 8 is a sectional view of an inner ring 210.

FIG. 8 is a sectional view of inner ring 210. As shown in FIG. 8, inner ring 210 is ring-shaped. The central axis of inner ring 210 is named a central axis A1. Inner ring 210 has a width face 210*a*, a width face 210*b*, an inner circumferential face 210*c*, and an outer circumferential face 210*d*. Width face 210*a*, width face 210*b*, inner circumferential face 210*c* and outer circumferential face 210*d* constitute the surface of inner ring 210.

In the following, the direction of central axis A1 is referred to as an axial direction. Also, in the following, the direction along the circumference about central axis A1 when viewed along the axial direction is referred to as a circumferential direction. Further, in the following, the direction orthogonal to the axial direction is referred to as a radial direction.

Width face 210*a* and width face 210*b* are end faces of inner ring 210 in the axial direction. Width face 210*b* is an opposite face of width face 210*a* in the axial direction.

Inner circumferential face 210*c* extends in the circumferential direction. Inner circumferential face 210*c* faces central axis A1 side. Inner circumferential face 210*c* connects at one end in the axial direction with width face 210*a*, and connects at the other end in the axial direction with width face 210*b*. Inner ring 210 is fitted with a shaft (not shown) in inner circumferential face 210*c*.

Outer circumferential face 210*d* extends in the circumferential direction. Outer circumferential face 210*d* faces opposite side of central axis A1. That is, outer circumferential face 210*d* is an opposite face of inner circumferential face 210c in the radial direction. Outer circumferential face 210d connects at one end in the axial direction with width face 210a, and connects at the other end in the axial direction with width face 210b.

Outer circumferential face 210d has a raceway surface 210da. Raceway surface 210da extends in the circumferential direction. Outer circumferential face 210d is recessed toward inner circumferential face 210c in raceway surface 210da. In the sectional view, raceway surface 210da has a partially circular shape. Raceway surface 210da is located in the center of outer circumferential face 210d in the axial direction. Raceway surface 210da is part of outer circumferential face 210d that comes into contact with a rolling element (not shown in FIG. 1).

Inner ring 210 is formed of steel. More specifically, inner ring 210 is formed of steel having been quenched and tempered. Steel that forms inner ring 210 contains carbon of greater than or equal to 0.70 mass % and less than or equal to 1.10 mass %, silicon of greater than or equal to 0.15 mass % and less than or equal to 0.35 mass %, manganese of greater than or equal to 0.30 mass % and less than or equal to 0.60 mass %, chromium of greater than or equal to 1.30 mass % and less than or equal to 1.60 mass %, vanadium of less than or equal to 0.50 mass % and molybdenum of less than or equal to 0.50 mass %. In the steel, the content of molybdenum is greater than or equal to 0.01 mass %, and the content of vanadium is greater than or equal to 0.01 mass %.

Carbon in steel that forms inner ring 210 is greater than or equal to 0.70 mass % so as to improve the hardness. Carbon in steel that forms inner ring 210 is less than or equal to 1.10 mass % so as to prevent a quenching crack.

Silicon in steel that forms inner ring 210 is greater than or equal to 0.15 mass % so as to enhance the resistance to temper softening and improve the workability.

Silicon in steel that forms inner ring 210 is less than or equal to 0.35 mass % because an excessive quantity of silicon contrarily deteriorates the workability.

Manganese in steel that forms inner ring 210 is greater than or equal to 0.30 mass % so as to secure the hardenability. Manganese in steel that forms inner ring 210 is less than or equal to 0.60 mass % because an excessive quantity of manganese results in increase in a manganese-based non-metallic inclusion in the steel.

Chromium in steel that forms inner ring 210 is greater than or equal to 1.30 mass % so as to secure the hardenability and form nitride and carbonitride. Chromium in steel that forms inner ring 210 is less than or equal to 1.60 mass % so as to prevent formation of a coarse precipitate.

Steel that forms inner ring 210 contains vanadium so as to fine nitride and carbonitride. Vanadium in steel that forms inner ring 210 is less than or equal to 0.50 mass % so as to prevent increase in cost due to addition of vanadium.

Steel that forms inner ring 210 contains molybdenum so as to fine nitride and carbonitride, and improve the hardenability. Molybdenum in steel that forms inner ring 210 is less than or equal to 0.50 mass % so as to prevent increase in cost due to addition of molybdenum.

Steel that forms inner ring 210 may contain carbon of greater than or equal to 0.90 mass % and less than or equal to 1.10 mass %, silicon of greater than or equal to 0.20 mass % and less than or equal to 0.30 mass %, manganese of greater than or equal to 0.40 mass % and less than or equal to 0.50 mass %, chromium of greater than or equal to 1.40 mass % and less than or equal to 1.60 mass %, vanadium of greater than or equal to 0.20 mass % and less than or equal to 0.30 mass % and molybdenum of greater than or equal to 0.10 mass % and less than or equal to 0.30 mass %. The remainder of steel that forms inner ring 210 is iron and inevitable impurities.

Figure 9:
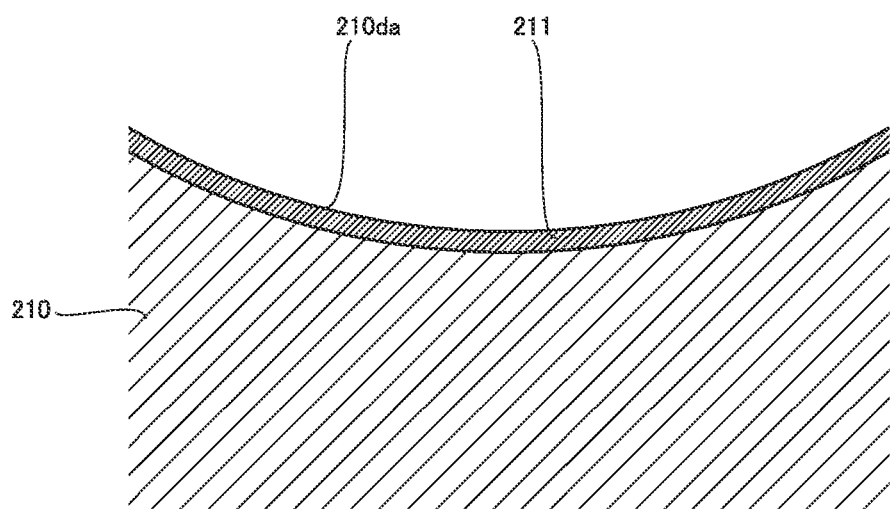
FIG. 9 is an enlarged view in IX in FIG. 8.

FIG. 9 is an enlarged view in TX in FIG. 8. As shown in FIG. 9, in inner ring 210, the region up to a distance of 20 μm from the surface is a superficial part 211. The surface of inner ring 210 has been subjected to, for example, a nitriding treatment. As a result, nitrogen concentration in steel of superficial part 211 is, for example, greater than or equal to 0.15 mass %. It is preferred that nitrogen concentration in steel of superficial part 211 is greater than or equal to 0.20 mass % and less than or equal to 0.30 mass %. Nitrogen concentration in steel of superficial part 211 is measured with an EPMA (Electron Probe Micro Analyzer).

In steel of superficial part 211, precipitates are dispersed. Precipitates are nitride based on chromium or vanadium, or carbonitride based on chromium or vanadium.

Nitride based on chromium (vanadium) is nitride of chromium (vanadium) or nitrides of chromium (vanadium) in which part chromium (vanadium) sites is substituted by an alloy element other than chromium (vanadium).

Carbonitrides based on chromium (vanadium) are carbides of chromium (vanadium) in which part of carbon sites is substituted by nitrogen. A chromium (vanadium) site in carbonitride based on chromium (vanadium) may be substituted by an alloy element other than chromium (vanadium)

It is preferred that the area fraction of precipitate in steel of superficial part 211 is less than or equal to 2.0%. It is preferred that the maximum grain size of precipitate in steel of superficial part 211 is less than or equal to 0.5 μm.

The area fraction and the maximum grain size of precipitate in steel of superficial part 211 are measured in the following method. First, in a cross section of inner ring 210 including superficial part 211, a sectional image (hereinafter, referred to as "SEM image") is acquired using SEM (Scanning Electron Microscope). The magnification at the time of acquiring the SEM image is 15000 times.

Second, the acquired SEM image is subjected to an image processing. More specifically, since precipitates appear in white in the SEM image, an area of each part that appears in white in the SEM image and the total area are calculated by the image processing.

The total area of the parts that appear in white in the SEM image is regarded as an area fraction of precipitate in steel of superficial part 211. The square root of the value obtained by dividing the maximum value of areas of parts that appear in white in the SEM image by π/4 is regarded as a maximum grain size of precipitates in steel of superficial part 211.

In steel of superficial part 211, cementite ($Fe_3C$) may further be dispersed. Part of iron sites in cementite may be substituted by an alloy element, and part of carbon sites in cementite may be substituted by nitrogen. It is preferred that the maximum grain size of cementite in steel of superficial part 211 is less than or equal to 1.5 μm.

The maximum grain size of cementite in steel of superficial part 211 is measured in the following method. First, in a cross section of inner ring 210 including superficial part 211, a SEM image is acquired. The magnification at the time of acquiring the SEM image is 15000 times. Second, the acquired SEM image is subjected to an image processing. More specifically, since cementite appears in a gray oval in the SEM image, areas of parts that appear in gray ovals in the SEM image are calculated by the image processing. Then, the square root of the value obtained by dividing the maximum value of areas of parts that in gray ovals in the SEM image by π/4 is regarded as the maximum grain size of cementite in steel of superficial part 211.

It is preferred that a volume ratio of retained austenite in steel is greater than or equal to 15% at a position where the distance from the surface of inner ring 210 is to be 50 μm. It is further preferred that a volume ratio of retained austenite in steel is greater than or equal to 25% and less than or equal to 35% at a position where the distance from the surface of inner ring 210 is to be 50 μm.

The volume ratio of retained austenite in steel is measured by an X-ray diffraction method. That is, by comparing the integrated intensity of diffraction peaks in X-ray diffraction of austenite, and integrated intensity of diffraction peaks in X-ray diffraction of phases other than austenite, the volume ratio of retained austenite in steel is calculated.

It is preferred that hardness of steel is greater than or equal to 58 HRC at a position where the distance from the surface of inner ring 210 is to be 50 μm. It is further preferred that hardness of steel is greater than or equal to 58 HRC and less than or equal to 64 HRC at a position where the distance from the surface of inner ring 210 is to be 50 μm. Hardness of steel is measured in accordance with the Rockwell hardness test method defined in JIS standard (JIS Z 2245.2016).

Steel of superficial part 211 has martensite block grains. Neighboring two martensite block grains have a difference in crystal orientation in the grain boundary of greater than or equal to 15°. From another perspective, even if there is a location where crystal orientation deviates, the location is not regarded as a crystal grain boundary of martensite block grains as long as the difference in crystal orientation is less than 15°. A grain boundary of martensite block grains is determined by an EBSD (Electron Back Scattered Diffraction) method.

In steel of superficial part 211, the maximum grain size of martensite block grains is less than or equal to 5.0 μm. The maximum grain size of martensite block grains in steel of superficial part 211 is measured in the following method.

First, in a cross section of inner ring 210 including superficial part 211, the cross section is observed. At this time, by the EBSD method, martensite block grains contained in the observation field are determined. This observation field is a region of 50 μm×35 μm. Second, from the crystal orientation data obtained by the EBSD method, respective areas of the martensite block grains contained in the observation field are analyzed. A square root of the value obtained by dividing the maximum value of respective areas of martensite block grains contained in the observation field by π/4 is regarded as the maximum grain size of martensite block grains in steel of superficial part 211.

In steel of superficial part 211, it is preferred that an average grain size of martensite block grains at a comparison area fraction of 30% is less than or equal to 2.0 μm. In steel of superficial part 211, it is preferred that an average grain size of martensite block grains at a comparison area fraction of 50% is less than or equal to 1.5 μm.

An average grain size of martensite block grains at a comparison area fraction of 30% (50%) is measured in the following method. First, in a cross section of inner ring 210 including superficial part 211, the cross section is observed. At this time, by the EBSD method, martensite block grains contained in the observation field are determined. This observation field is a region of 50 μm×35 μm. Second, from the crystal orientation data obtained by the EBSD method, respective areas of the martensite block grains contained in the observation field are analyzed.

Third, respective areas of the martensite block grains contained in the observation field are added up in descending order of area. The addition is performed until the 30% (50%) of the total area of the martensite block grains contained in the observation field is reached. For each of the martensite block grains that are objects of the addition, an equivalent circle diameter is calculated. The equivalent circle diameter is a square root of a value obtained by dividing the area of the martensite block grain by π/4. An average value of equivalent circle diameters of martensite block grains that are objects of the addition is regarded as an average grain size of martensite block grains at a comparison area fraction of 30% (50%).

In steel of superficial part 211, the maximum value of crystal orientation density of {011} plane of martensite block grains is less than or equal to 3.25-fold random. The maximum value of crystal orientation density of {011} plane of martensite block grains in steel of superficial part 211 is determined in the following method.

First, in a cross section of inner ring 210 including superficial part 211, the cross section is observed. At this time, by the EBSD method, martensite block grains contained in the observation field are determined. This observation field is a region of 50 μm×35 μm. Second, from the crystal orientation data obtained by the EBSD method, crystal orientation density distribution of {011} plane of martensite block grains is analyzed according to a method described in H. J. Bunge, Mathematische Methoden der Texturanalyse, Akademie-Verlag (1969) using spherical surface harmonics. The highest value of crystal orientation density in the crystal orientation density distribution is regarded as the maximum value of crystal orientation density of {011} plane.

The smaller the maximum value of crystal orientation density of {011} plane of martensite block grains in steel of superficial part 211, the higher the randomness of formation orientation of {011} plane of martensite block grains in steel of superficial part 211.

(Method for Producing Inner Ring 210)

Figure 10:
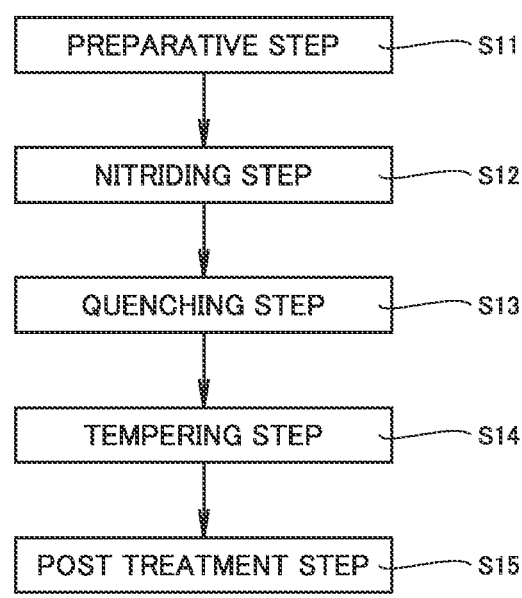
FIG. 10 is a process chart showing a method for producing inner ring 210.

FIG. 10 is a process chart showing a method for producing inner ring 210. As shown in FIG. 10, the method for producing inner ring 210 has a preparative step S11, a nitriding step S12, a quenching step S13, a tempering step S14, and a post treatment step S15. Nitriding step S12 is conducted after preparative step S11. Quenching step S13 is conducted after nitriding step S12. Tempering step S14 is conducted after quenching step S13. Post treatment step S15 is conducted after tempering step S14.

In preparative step S11, a workpiece is prepared. The workpiece is a ring-shaped member formed of the same steel as that of inner ring 210.

In nitriding step S12, a nitriding treatment is conducted for the surface of the workpiece. The nitriding treatment is conducted by retaining the workpiece at a temperature of greater than or equal to the $A_1$ transformation point of steel that forms the workpiece in an atmosphere containing a nitrogen source (for example, ammonia).

In quenching step S13, quenching is conducted for the workpiece. Quenching is conducted by retaining the workpiece at a temperature of greater than or equal to the $A_1$ transformation point of steel that forms the workpiece, followed by rapidly cooling to a temperature of less than or equal to the $M_S$ transformation point of steel that forms the workpiece. The temperature of heating and retaining in quenching step S13 is preferably less than or equal to the temperature of heating and retaining in nitriding step S12. Quenching step S13 may be conducted twice. It is preferred that the heating and retaining temperature in second quenching step S13 is lower than the heating and retaining temperature in first quenching step S13 As a result, precipitates are finely and abundantly dispersed in the superficial part of the workpiece.

In tempering step S14, tempering is conducted for the workpiece. Tempering is conducted by retaining the workpiece at a temperature of less than the $A_1$ transformation point of steel that forms the workpiece. In post treatment step S15, machining (grinding, polishing) and washing and the like are conducted for the surface of the workpiece. Thus, inner ring 210 having the structure shown in FIG. 1 and FIG. 9 is formed.

Since the orientations in which martensite block grains are likely to be formed are not distributed in specific orientations due to fine and abundant dispersion of precipitates in steel of superficial part 211, the maximum value of crystal orientation density of {011} plane of martensite block grains in steel of superficial part 211 decreases. Also, since martensite block grains are difficult to grow large due to fine and abundant dispersion of precipitates in steel of superficial part 211, the maximum grain size of martensite block grains in steel of superficial part 211 becomes less than or equal to 5.0 µm.

(Effect of Inner Ring 210)

In inner ring 210, martensite block grains are fined so that the maximum grain size is less than or equal to 5.0 µm, and formation orientations of martensite block grains are made random so that the maximum value of crystal orientation density of {011} plane is less than or equal to 3.25-fold random in steel of superficial part 211. As a result, in inner ring 210, increased toughness of superficial part 211 improves the shear resistance of the surface of inner ring 210 that comes into contact with a rolling element (specifically, raceway surface 210da). As described above, according to inner ring 210, the durability is improved.

When the area fraction of precipitate in steel of superficial part 211 is greater than or equal to 2.0% (namely, when precipitates are dispersed at high density in steel of superficial part 211), the durability is further improved by improvement in shear resistance of the surface of inner ring 210 that comes into contact with a rolling element (specifically, raceway surface 210da).

When the maximum grain size of precipitate in steel of superficial part 211 is 0.5 µm, precipitates are finely dispersed at a high density in steel of superficial part 211, so that abrasion resistance and toughness are improved, and durability of inner ring 210 is further improved. When the maximum grain size of cementite in steel of superficial part 211 is less than or equal to 1.5 µm, abrasion resistance and toughness of inner ring 210 are further improved by fine dispersion of cementite.

When martensite block grains are fined so that the average grain size at a comparison area fraction of 30% (50%) is less than or equal to 2.0 µm (1.5 µm) in steel of superficial part 211, toughness in superficial part 211 is improved, so that durability of inner ring 210 is further improved.

When the volume ratio of retained austenite in steel at a position where the distance from the surface of inner ring 210 is to be 50 µm is greater than or equal to 15% (greater than or equal to 25% and less than or equal to 35%), durability against dent-initiated flaking under a contaminated environment is improved. When the hardness of steel at a position where the distance from the surface of inner ring 210 is to be 50 µm is greater than or equal to 58 HRC (greater than or equal to 58 HRC and less than or equal to 64 HRC), abrasion resistance of inner ring 210 is further improved.

(Rolling Bearing According to Second Embodiment)

Hereinafter, a rolling bearing according to the second embodiment (referred to as a "rolling bearing 200") is described.

Figure 11:
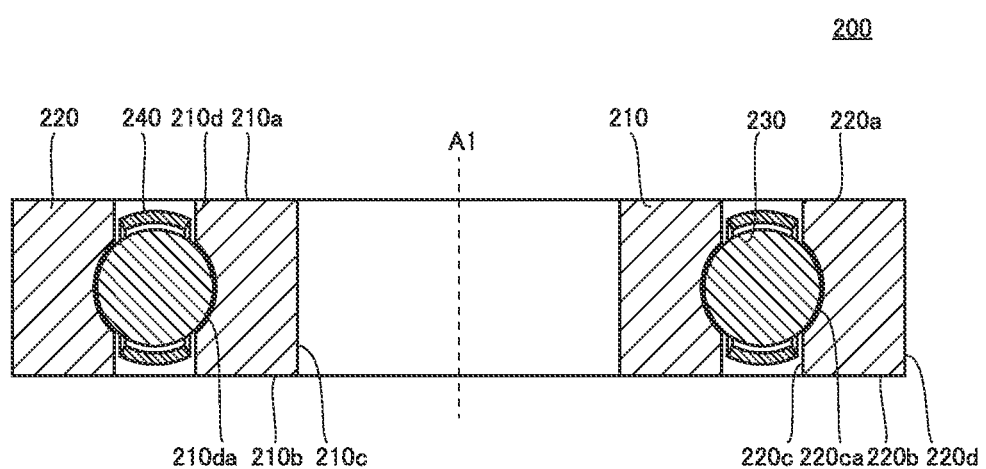
FIG. 11 is a sectional view of a rolling bearing 200.

FIG. 11 is a sectional view of rolling bearing 200. As shown in FIG. 11, rolling bearing 200 is a deep groove ball bearing. However, rolling bearing 200 is not limited to this. Rolling bearing 200 may be, for example, a thrust ball bearing. Rolling bearing 200 has inner ring 210, outer ring 220, a rolling element 230, and a retainer 240.

Outer ring 220 has a width face 220a, a width face 220b, an inner circumferential face 220c, and an outer circumferential face 220d. The surface of outer ring 220 is configured by width face 220a, width face 220b, inner circumferential face 220c and outer circumferential face 220d.

Width face 220a and width face 220b are end faces of outer ring 220 in the axial direction. Width face 220b is an opposite face of width face 220a in the axial direction.

Inner circumferential face 220c extends in the circumferential direction. Inner circumferential face 220c faces central axis A1 side. Inner circumferential face 220c connects at one end in the axial direction with width face 220a, and connects at the other end in the axial direction with width face 220b. Outer ring 220 is arranged such that inner circumferential face 220c faces with outer circumferential face 210d.

Inner circumferential face 220c has a raceway surface 220ca. Raceway surface 220ca extends in the circumferential direction. Inner circumferential face 220c is recessed toward outer circumferential face 220d in raceway surface 220ca. In the sectional view, raceway surface 220ca has a partially circular shape. Raceway surface 220ca is located in the center of inner circumferential face 220c in the axial direction. Raceway surface 220ca is part of inner circumferential face 220c that comes into contact with rolling element 230.

Outer circumferential face 220d extends in the circumferential direction. Outer circumferential face 220d faces opposite side of central axis A1. That is, outer circumferential face 220d is an opposite face of inner circumferential face 220c in the radial direction. Outer circumferential face 220d connects at one end in the axial direction with width face 220a, and connects at the other end in the axial direction with width face 220b. Outer ring 220 is fitted with a housing (not shown) in outer circumferential face 220d.

Rolling element 230 has a globular shape. Rolling element 230 is arranged between outer circumferential face 210d (raceway surface 210da) and inner circumferential face 220c (raceway surface 220ca). Retainer 240 has a ring-like shape, and is arranged between outer circumferential face 210d and inner circumferential face 220c. Retainer 240 retains rolling element 230 such that an interval between two rolling elements 230 neighboring in the circumferential direction falls within a certain range.

Outer ring 220 and rolling element 230 may be formed of the same steel as that of inner ring 210. The superficial part of outer ring 220 (region up to a distance of 20 µm from the surface of outer ring 220) and the superficial part of rolling element 230 (region up to a distance of 20 µm from the surface of rolling element 230) may have the same configuration as superficial part 211.

(Rolling Fatigue Life Test)

For confirming the effect of the bearing component according to the second embodiment, a rolling fatigue life test was conducted. For the rolling fatigue life test, sample 4, sample 5, and sample 6 were used. Sample 4 to sample 6 are thrust ball bearings of the model number 51106 defined in JIS standard.

In sample 4, a washer (inner ring and outer ring) was formed of a first steel material. In sample 5 and sample 6, a washer was formed of a second steel material. Compositions of the first steel material and the second steel material are shown in Table 8. As shown in Table 8, ingredients of the first steel material and the second steel material are almost the same except for the contents of molybdenum and vanadium. The second steel material corresponds to SUJ2 which is a high carbon chromium bearing steel defined in JIS standard.

As shown in Table 10, in steel of the superficial part of the washer of sample 4, the area fraction of precipitate was 2.7%. As shown in Table 10, in steel of the superficial part of sample 5, the area fraction of precipitate was 1.6%. That is, in the superficial part of the washer of sample 4, precipitates were dispersed at a higher density as compared with the superficial part of the washer of sample 5. This comparison revealed that addition of vanadium and molybdenum of less than or equal to 0.5 mass % results in dispersion of precipitates at a high density in steel of the superficial part of the washer.

In the superficial part of the washer of sample 4, the maximum grain size of precipitate was 0.5 μm. In the superficial part of the washer of sample 5, the maximum

TABLE 8

| | C(mass %) | Si(mass %) | Mn(mass %) | Cr(mass %) | Mo(mass %) | V(mass %) | Remainder |
|---|---|---|---|---|---|---|---|
| First steel material | 1.00 | 0.26 | 0.44 | 1.51 | 0.24 | 0.24 | Fe and inevitable impurity |
| Second steel material | 0.99 | 0.26 | 0.44 | 1.51 | — | — | |

Figure 12:
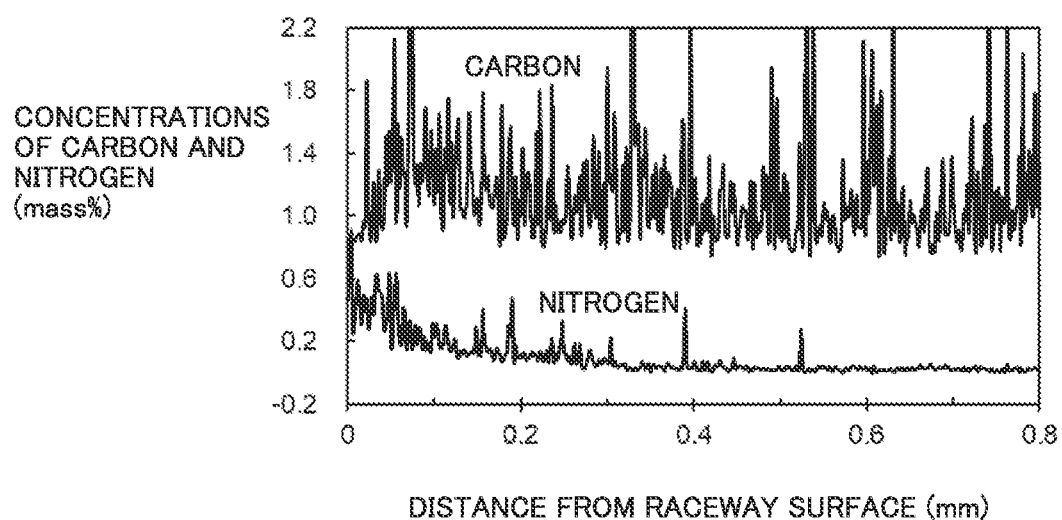
FIG. 12 is a graph showing measurement results of nitrogen concentration and carbon concentration in the vicinity of the raceway surface of a washer of a sample 4.
Figure 13:
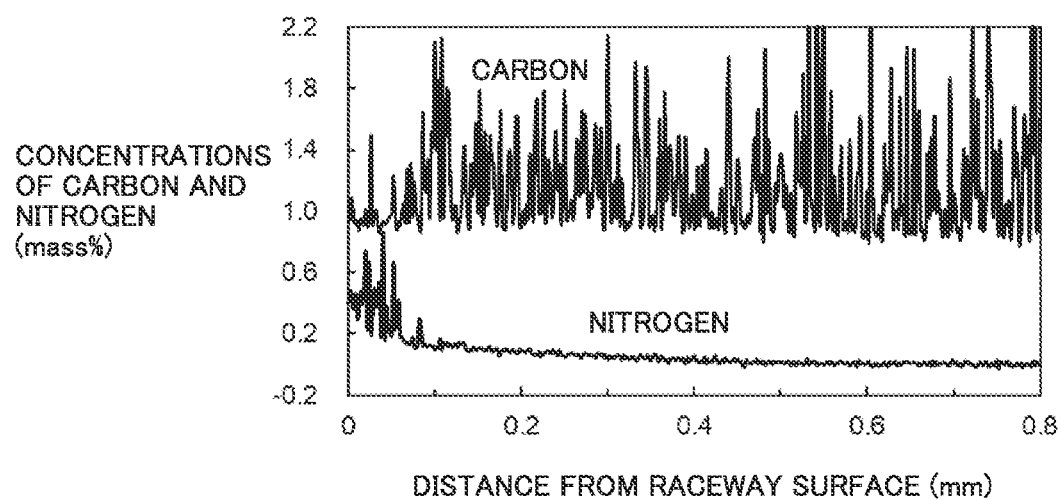
FIG. 13 is a graph showing measurement results of nitrogen concentration and carbon concentration in the vicinity of the raceway surface of a washer of a sample 5.

FIG. 12 is a graph showing measurement results of nitrogen concentration and carbon concentration in the vicinity of the raceway surface of the washer of sample 4. FIG. 13 is a graph showing measurement results of nitrogen concentration and carbon concentration in the vicinity of the raceway surface of the washer of sample 5. The horizontal axis in FIG. 12 and FIG. 13 indicates distance from the raceway surface (unit mm), and the vertical axis in FIG. 12 and FIG. 13 indicate concentration of carbon or nitrogen (unit: mass %).

As shown in FIG. 12 and FIG. 13, in sample 4 and sample 5, a nitriding treatment was conducted for the surface of the washers. The heating and retaining temperature in conducting the nitriding treatment was 850° C. On the other hand, in sample 6, a nitriding treatment was not conducted for the surface of the washer.

Table 9 shows nitrogen concentrations in the superficial parts (region up to a distance of 20 μm from raceway surface) of the washers of sample 4 to sample 6. As shown in Table 9, in steel of the superficial parts of the washers of sample 4 and sample 5, nitrogen concentrations were greater than or equal to 0.3% and less than or equal to 0.5%. In steel of superficial parts of the washer of sample 6, nitrogen concentration was 0.0%.

TABLE 9

| | Nitrogen concentration in superficial part (mass %) |
|---|---|
| Sample 4 | 0.3-0.5 |
| Sample 5 | 0.3-0.5 |
| Sample 6 | 0.0 |

Quenching and tempering were conducted for the washers of sample 4 to sample 6. The heating and retaining temperature at the time of quenching was 850° C. The heating and retaining temperature at the time of tempering was 180° C. The heating and retaining time at the time of tempering was 2 hours.

Figure 14:
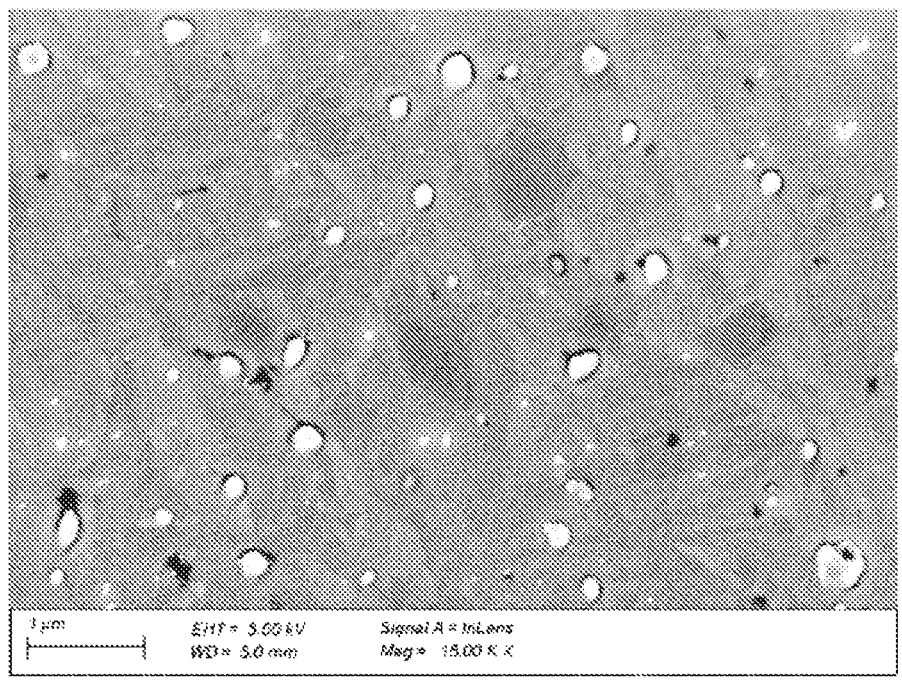
FIG. 14 is a SEM image in a superficial part of the washer of sample 4.
Figure 15:
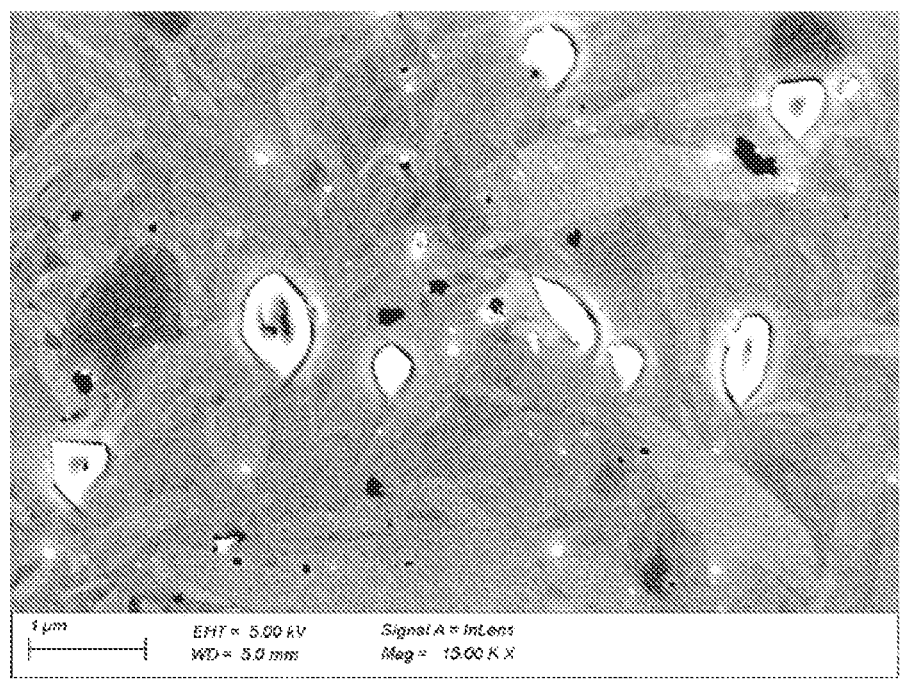
FIG. 15 is a SEM image in a superficial part of the washer of sample 5.

FIG. 14 is a SEM image in the superficial part of the washer of sample 4. FIG. 15 is a SEM image in the superficial part of the washer of sample 5. In SEM images in FIG. 14 and FIG. 15, a white part is a precipitate, and an oval gray part is cementite.

grain size of precipitate was 1.1 μm. That is, in the superficial part of the washer of sample 4, precipitates were finely dispersed as compared with the superficial part of the washer of sample 5. This comparison revealed that addition of vanadium and molybdenum of less than or equal to 0.5 mass % results in high-density and fine dispersion of precipitates in steel of the superficial part of the washer.

TABLE 10

| | Area fraction of precipitate in superficial part (%) | Maximum grain size of precipitate in superficial part (μm) |
|---|---|---|
| Sample 4 | 2.7 | 0.5 |
| Sample 5 | 1.6 | 1.1 |

As shown in Table 11, in the superficial parts of the washers of sample 4 and sample 5, the maximum grain size of cementite was less than or equal to 1.5 μm. In the superficial part of the washer of sample 6, the maximum grain size of cementite was greater than 1.5 μm.

TABLE 11

| | Maximum grain size of cementite in superficial part (μm) |
|---|---|
| Sample 4 | 1.01 |
| Sample 5 | 1.11 |
| Sample 6 | 2.10 |

As shown in Table 12, in sample 4 and sample 5, a volume ratio of retained austenite in steel was greater than or equal to 15% at a position where the distance from the raceway surface is to be 50 μm. In sample 6, a volume ratio of retained austenite in steel was less than 15% at a position where the distance from the raceway surface is to be 50 μm. In sample 4 to sample 6, hardness of steel was greater than or equal to 58 HRC at a position where the distance from the raceway surface is to be 50 μm.

TABLE 12

|  | Volume ratio of retained austenite at position of distance of 50 μm from raceway surface (%) | Hardness at position of distance of 50 μm from raceway surface (HRC) |
|---|---|---|
| Sample 4 | 30-31 | 62-63 |
| Sample 5 | 30-31 | 62-63 |
| Sample 6 | 10-12 | 62-63 |

Figure 16:
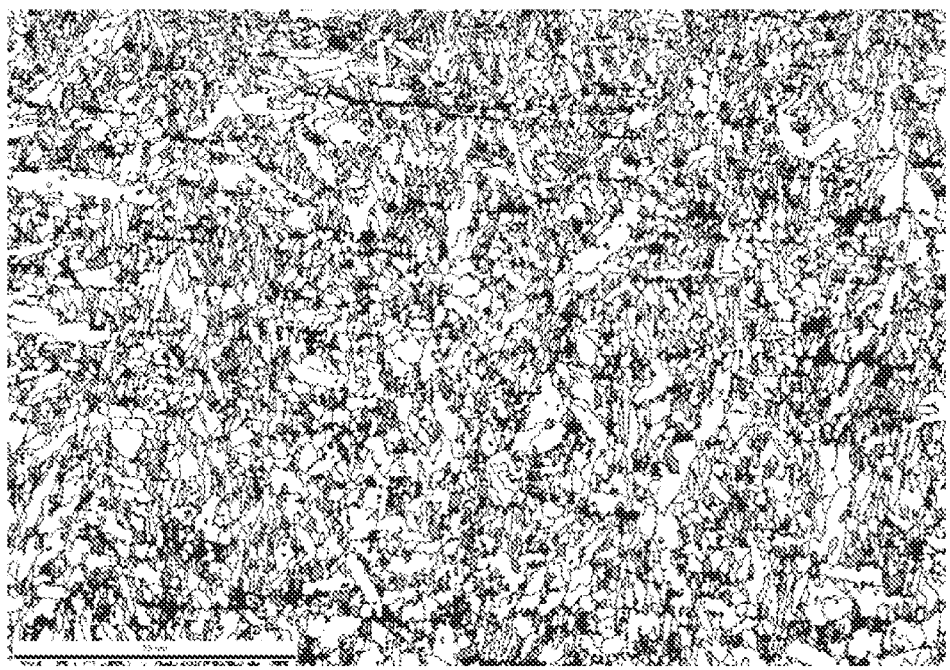
FIG. 16 is a phase map of EBSD in the superficial part of the washer of sample 4.
Figure 17:
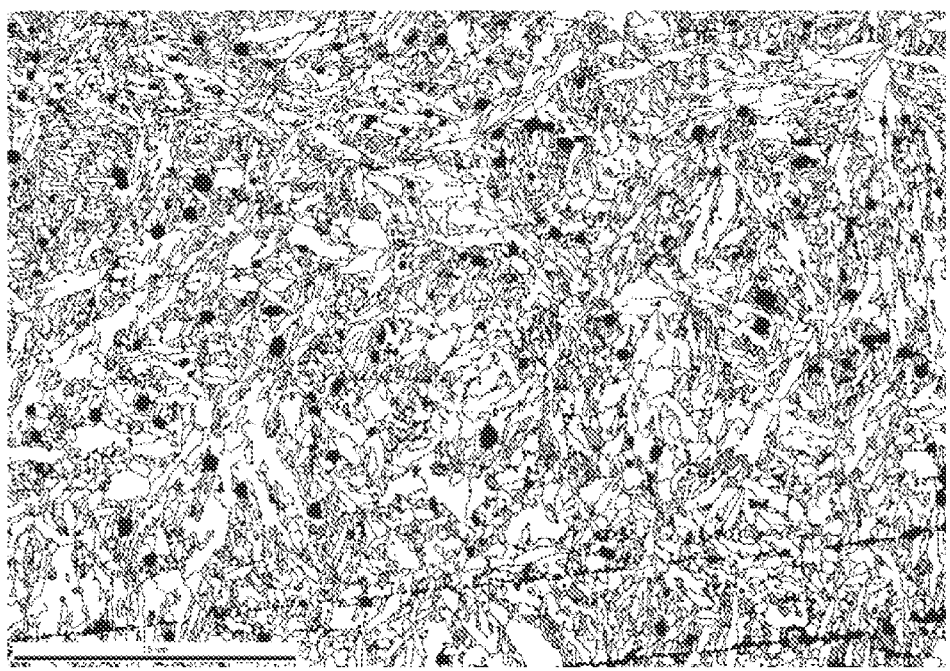
FIG. 17 is a phase map of EBSD in the superficial part of the washer of sample 5.
Figure 18:
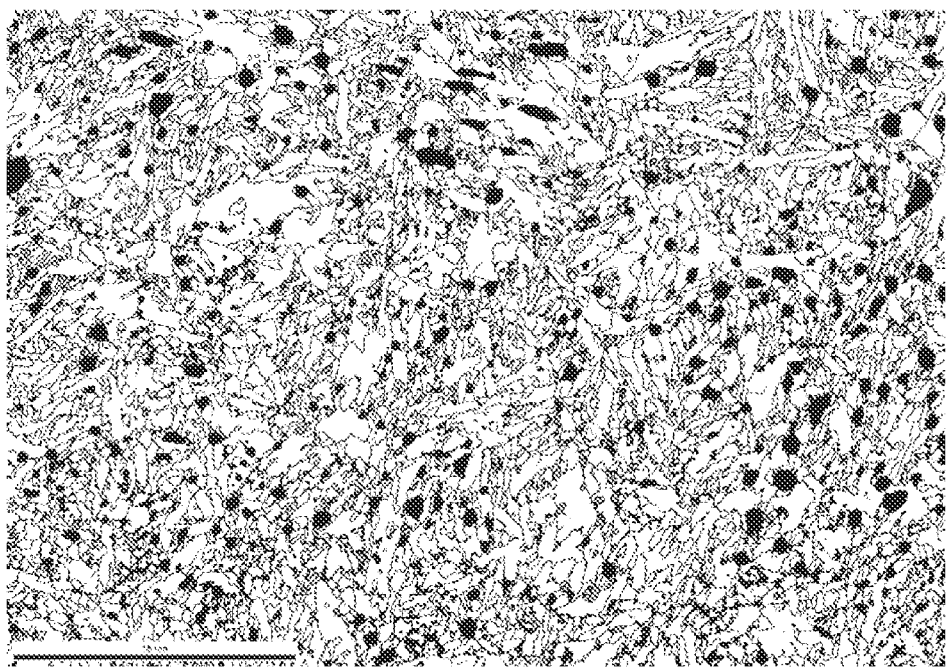
FIG. 18 is a phase map of EBSD in a superficial part of a washer of a sample 6.

FIG. 16 is a phase map of EBSD in the superficial part of the washer of sample 4. FIG. 17 is a phase map of EBSD in the superficial part of the washer of sample 5. FIG. 18 is a phase map of EBSD in the superficial part of the washer of sample 6. In FIG. 16 to FIG. 18, martensite block grains appear in white.

As shown in FIG. 16 to FIG. 18 and Table 13, in the superficial part of the washer of sample 4, the maximum value of crystal orientation density of {011} plane of martensite block grains was less than or equal to 3.25-fold random. On the other hand, in the superficial part of the washer of sample 4, the maximum value of crystal orientation density of {011} plane of martensite block grains was greater than 3.25-fold random.

TABLE 13

|  | Maximum value of crystal orientation density of martensite block grains (-fold random) |
|---|---|
| Sample 4 | 3.16 |
| Sample 5 | 3.32 |
| Sample 6 | 3.82 |

As shown in FIG. 16 to FIG. 18 and Table 14, in the superficial part of the washer of sample 4, the maximum grain size of martensite block grains was less than or equal to 5.0 μm. On the other hand, in the superficial parts of the washers of sample 5 and sample 6, the maximum grain size of martensite block grains was greater than 5.0 μm.

TABLE 14

|  | Maximum grain size of martensite block grains (μm) |
|---|---|
| Sample 4 | 4.4 |
| Sample 5 | 6.6 |
| Sample 6 | 5.2 |

Figure 19:
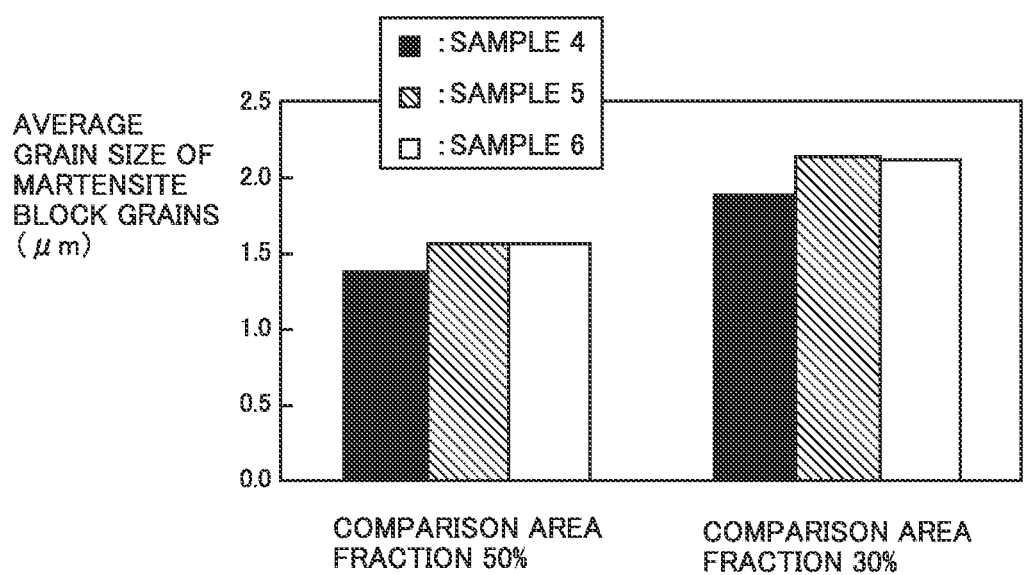
FIG. 19 is a bar graph showing average grain sizes of martensite block grains in the superficial parts of the washers of sample 4 to sample 6.

FIG. 19 is a bar graph showing average grain sizes of martensite block grains in the superficial parts of the washers of sample 4 to sample 6. The vertical axis of the graph of FIG. 19 indicates average grain size (unit: μm) of martensite block grains.

As shown in FIG. 19, in the superficial part of the washer of sample 4, an average grain size of martensite block grains at a comparison area fraction of 30% was less than or equal to 2.0 μm. On the other hand, in the superficial parts of the washers of sample 5 and sample 6, an average grain size of martensite block grains at a comparison area fraction of 30% was greater than 2.0 μm.

In the superficial part of the washer of sample 4, an average grain size of martensite block grains at a comparison area fraction of 50% was less than or equal to 1.5 μm. On the other hand, in the superficial parts of the washers of sample 5 and sample 6, an average grain size of martensite block grains at a comparison area fraction of 50% was greater than 1.5 μm.

Figure 20:
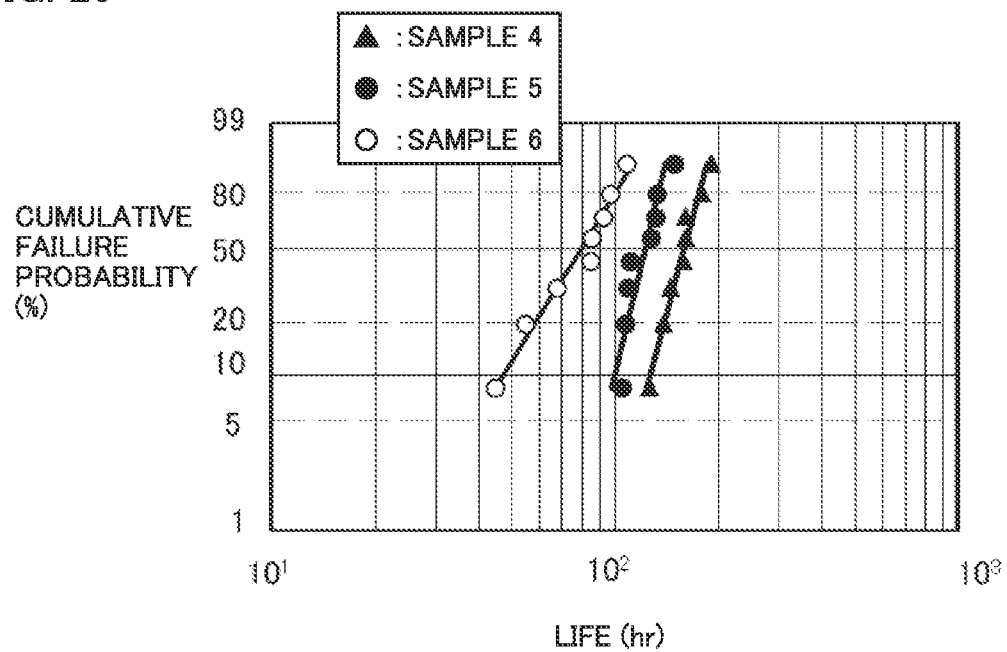
FIG. 20 is a graph showing a result of a rolling fatigue life test.

FIG. 20 is a graph showing a result of a rolling fatigue life test. The horizontal axis of the graph of FIG. 20 indicates life (unit: hr), and the vertical axis of the graph of FIG. 13 indicates cumulative failure probability (unit: %). The rolling fatigue life test was conducted under the conditions shown in Table 15. To be more specific, the maximum contact surface pressure between the rolling element and the washer was 2.3 GPa, and the washer was rapidly accelerated and decelerated between 0 rpm and 2500 rpm, and polyglycol oil to which pure water was added was used as a lubricant.

TABLE 15

| Maximum contact surface pressure | 2.3 GPa |
|---|---|
| Number of revolutions | Rapid acceleration and deceleration between 0 rpm and 2500 rpm. |
| Lubricant | Polyglycol + pure water |

As shown in FIG. 20 and Table 16, sample 4 showed excellent rolling fatigue life as compared with sample 5. More specifically, the $L_{10}$ life (the life at which the cumulative failure probability reaches 10%) of sample 4 was 2.7 times as compared with the $L_{10}$ life of sample 6, and the $L_{10}$ life of sample 5 was 2.1 times as compared with the $L_{10}$ life of sample 6.

As described above, in the superficial part of the washer of sample 4, the maximum value of crystal orientation density of {011} plane of martensite grains was less than or equal to 3.25-fold random, and the maxim grain size of martensite grains was less than or equal to 5.0 μm. On the other hand, in the superficial parts of the washers of sample 5 and sample 6, the maximum value of crystal orientation density of {011} plane of martensite grains was greater than 3.25-fold random, and the maxim grain size of martensite grains was greater than 5.0 μm. This comparison revealed that the durability is improved by the bearing component according to the second embodiment.

TABLE 16

|  | Ratio of $L_{10}$ life to sample 6 |
|---|---|
| Sample 4 | 2.7 |
| Sample 5 | 2.1 |
| Sample 6 | 1.0 |

Also, as described above, in the superficial part of the washer of sample 4, precipitates were dispersed at a higher density as compared with the superficial part of the washer of sample 5. This comparison revealed that the durability of the bearing component according to the second embodiment is further improved by setting the area fraction and maximum grain size of precipitates in the superficial part at greater than or equal to 2.0% and less than or equal to 0.5 μm, respectively.

Also, the $L_{10}$ life of sample 5 was longer than the $L_{10}$ life of sample 6. As described above, in the superficial part of the washer of sample 5, the maximum grain size of cementite was less than or equal to 1.5 μm, whereas in the superficial part of the washer of sample 6, the maximum grain size of cementite was greater than 1.5 μm. Also, in the washer of sample 5, a volume ratio of retained austenite at a position where the distance from the raceway surface is to be 50 μm was greater than or equal to 15%, whereas, in the washer of sample 6, a volume ratio of retained austenite at a position where the distance from the raceway surface is to be 50 μm was less than 15%.

This comparison revealed that the durability of the bearing component is improved by setting the maximum grain size of cementite in the superficial part of the bearing component at less than or equal to 1.5 μm, and setting the volume ratio of retained austenite at the position where the distance from the surface of the bearing component is to be 50 μm at greater than or equal to 15%.

<Hydrogen Penetration Property>

Hydrogen penetration property into the superficial parts of the washers of sample 4 and sample 6 was evaluated by the following method. In this evaluation, first, by heating the washers of sample 4 and sample 6 before being subjected to the rolling fatigue life test, to 400° C. from the room temperature, hydrogen release amounts from the washers of sample 4 and sample 6 before being subjected to the rolling fatigue life test were measured. Secondly, by heating the washers of sample 4 and sample 6 after being subjected to the rolling fatigue life test for 50 hours, to 400° C. from the room temperature, hydrogen release amounts from the washers of sample 4 and sample 6 after being subjected to the rolling fatigue life test for 50 hours were measured.

In sample 6, the ratio of hydrogen release amount before and after the rolling fatigue life test (namely, the value obtained by dividing the hydrogen release amount after being subjected to the rolling fatigue life test by the hydrogen release amount before being subjected to the rolling fatigue life test) was 3.2. On the other hand, in sample 4, the ratio of hydrogen release amount before and after the rolling fatigue life test was 0.9. This comparison experimentally revealed that by formation of superficial part 211 in the contact surface, penetration of hydrogen into superficial part 211 is prevented, and early flaking caused by hydrogen brittleness is prevented.

While embodiments of the present invention have been described, the above-described embodiments may be modified in various ways. The scope of the present invention is not limited to the above-described embodiments. The scope of the present invention is indicated by the appended claims, and is intended to include all modifications within the equivalent meaning and scope of the claims.

INDUSTRIAL APPLICABILITY

The above-described embodiments are applied especially advantageously to raceway members such as an inner ring, an outer ring and the like, rolling elements such as a ball, and rolling bearings using the same.

REFERENCE SIGNS LIST

10: inner ring, 10a: first face, 10aa: raceway surface. 10b: second face, 10c: inner circumferential face, 10d: outer circumferential face, 20: outer ring, 20a: first face, 20aa: raceway surface, 20b: second face, 20c: inner circumferential face, 20d: outer circumferential face, 30: ball, 40: retainer, 50 superficial part, 100: rolling bearing, A: central axis, S1: preparative step, S2: heat treatment step, S3: finishing step, S4: assembling step, S21: heating step, S22: cooling step, S23: tempering step, 210: inner ring, 210a, 210b: width face, 210c: inner circumferential face. 210d: outer circumferential face, 210da: raceway surface, 211: superficial part. 220: outer ring, 220a, 220b: width face, 220c: inner circumferential face, 220ca: raceway surface, 220d: outer circumferential face, 230: rolling element, 240: retainer, 200: rolling bearing, A1: central axis, S11: preparative step, S12: nitriding step, S13 quenching step, S14: tempering step, S15: post treatment step.

The invention claimed is:

1. A rolling member formed of quenched steel having a contact surface, the rolling member including a superficial part in a region up to a depth of 20 μm from the contact surface, the steel containing greater than or equal to 0.70 mass % and less than or equal to 1.10 mass % of carbon, greater than or equal to 0.15 mass % and less than or equal to 0.35 mass % of silicon, greater than or equal to 0.30 mass % and less than or equal to 0.60 mass % of manganese, greater than or equal to 1.30 mass % and less than or equal to 1.60 mass % of chromium, greater than or equal to 0.01 mass % and less than or equal to 0.50 mass % of molybdenum, and greater than or equal to 0.01 mass % and less than or equal to 0.50 mass % of vanadium, and the remainder of iron and inevitable impurities, a content of nitrogen in the superficial part being greater than or equal to 0.2 mass % and less than or equal to 0.8 mass %.

2. The rolling member according to claim 1, wherein the steel contains greater than or equal to 0.90 mass % and less than or equal to 1.10 mass % of carbon, greater than or equal to 0.20 mass % and less than or equal to 0.30 mass % of silicon, greater than or equal to 0.40 mass % and less than or equal to 0.50 mass % of manganese, greater than or equal to 1.40 mass % and less than or equal to 1.60 mass % of chromium, greater than or equal to 0.20 mass % and less than or equal to 0.30 mass % of molybdenum, and greater than or equal to 0.20 mass % and less than or equal to 0.30 mass % of vanadium, and the remainder of iron and inevitable impurities, and the content of nitrogen in the superficial part is greater than or equal to 0.3 mass % and less than or equal to 0.5 mass %.

3. The rolling member according to claim 1, wherein in a sectional view that is orthogonal to the contact surface, a total of greater than or equal to 60 precipitates having a grain size of less than or equal to 0.50 μm exist per 100 μm² in the superficial part, and a total of area fractions of precipitates in the superficial part is greater than or equal to 1% and less than or equal to 10%, a volume fraction of retained austenite quantity at a position of 50 μm deep from the contact surface is greater than or equal to 20% and less than or equal to 40%, and hardness at a position of 50 μm deep from the contact surface is greater than or equal to 653 Hv and less than or equal to 800 Hv.

4. The rolling member according to claim 1, wherein in a sectional view that is orthogonal to the contact surface, a total of greater than or equal to 80 precipitates having a grain size of less than or equal to 0.50 μm exist per 100 μm² in the superficial part, and a total of area fractions of precipitates in the superficial part is greater than or equal to 2% and less than or equal to 7%, a volume fraction of retained austenite quantity at a position of 50 μm deep from the contact surface is greater than or equal to 25% and less than or equal to 35%, and hardness at a position of 50 μm deep from the contact surface is greater than or equal to 653 Hv and less than or equal to 800 Hv.

5. A rolling bearing comprising:
a raceway member; and
a rolling element arranged in contact with the raceway member,
at least either the raceway member or the rolling element being the rolling member according to claim 1.

6. A bearing component of steel having a surface, the bearing component including a superficial part that is a region up to a distance of 20 μm from the surface,
the steel containing greater than or equal to 0.70 mass % and less than or equal to 1.10 mass % of carbon, greater than or equal to 0.15 mass % and less than or equal to 0.35 mass % of silicon, greater than or equal to 0.30 mass % and less than or equal to 0.60 mass % of manganese, greater than or equal to 1.30 mass % and less than or equal to 1.60 mass % of chromium, less than or equal to 0.50 mass % of vanadium, and less than or equal to 0.50 mass % of molybdenum, and the remainder of iron and inevitable impurities,
the steel of the superficial part having martensite block grains, and precipitates,
the precipitates being nitride based on chromium or vanadium, or carbonitride based on chromium or vanadium,
in the steel of the superficial part, a maximum grain size of the martensite block grain being less than or equal to 5.0 μm,
in the steel of the superficial part, a maximum value of crystal orientation density of a {011} plane of the martensite block being less than or equal to 3.25-fold random.

7. The bearing component according to claim 6, wherein the steel contains greater than or equal to 0.90 mass % and less than or equal to 1.10 mass % of carbon, greater than or equal to 0.20 mass % and less than or equal to 0.30 mass % of silicon, greater than or equal to 0.40 mass % and less than or equal to 0.50 mass % of manganese, greater than or equal to 1.40 mass % and less than or equal to 1.60 mass % of chromium, greater than or equal to 0.20 mass % and less than or equal to 0.30 mass % of vanadium, and greater than or equal to 0.10 mass % and less than or equal to 0.30 mass % of molybdenum, and the remainder of iron and inevitable impurities.

8. The bearing component according to claim 6, wherein an area fraction of the precipitates in the steel of the superficial part is greater than or equal to 2.0%.

9. The bearing component according to claim 6, wherein in the steel of the superficial part, a maximum grain size of the precipitates is less than or equal to 0.5 μm.

10. The bearing component according to claim 6, wherein the steel of the superficial part further has cementite, and
in the steel of the superficial part, a maximum grain size of the cementite is less than or equal to 1.5 μm.

11. The bearing component according to claim 6, wherein in the steel of the superficial part, an average grain size of the martensite block grains at a comparison area fraction of 30% is less than or equal to 2.0 μm.

12. The bearing component according to claim 6, wherein in the steel of the superficial part, an average grain size of the martensite block grains at a comparison area fraction of 50% is less than or equal to 1.5 μm.

13. The bearing component according to claim 6, wherein a nitrogen concentration in the steel of the superficial part is greater than or equal to 0.15 mass %.

14. The bearing component according to claim 6, wherein a volume ratio of retained austenite in the steel at a position where a distance from the surface is to be 50 μm is greater than or equal to 15%.

15. The bearing component according to claim 6, wherein hardness of the steel at a position where a distance from the surface is to be 50 μm is greater than or equal to 58 HRC.

16. The bearing component according to claim 6, wherein
at a position where a distance from the surface is to be 50 μm, a volume ratio of retained austenite in the steel is greater than or equal to 25% and less than or equal to 35%, and
at a position where a distance from the surface is to be 50 μm, hardness of the steel is greater than or equal to 58 HRC and less than or equal to 64 HRC.

17. A rolling bearing comprising:
an inner ring;
an outer ring; and
a rolling element,
at least one of the inner ring, the outer ring or the rolling element being the bearing component according to claim 6.

18. A bearing component of steel having a surface, the bearing component including a superficial part that is a region up to a distance of 20 μm from the surface,
the steel containing greater than or equal to 0.70 mass % and less than or equal to 1.10 mass % of carbon, greater than or equal to 0.15 mass % and less than or equal to 0.35 mass % of silicon, greater than or equal to 0.30 mass % and less than or equal to 0.60 mass % of manganese, greater than or equal to 1.30 mass % and less than or equal to 1.60 mass % of chromium, less than or equal to 0.50 mass % of vanadium, and less than or equal to 0.50 mass % of molybdenum, and the remainder of iron and inevitable impurities,
in the steel of the superficial part, precipitate being dispersed,
the precipitates being nitride based on chromium or vanadium, or carbonitride based on chromium or vanadium,
an area fraction of the precipitates in the steel of the superficial part being greater than or equal to 2.0%.

19. A bearing component of steel having a surface, the bearing component including a superficial part that is a region up to a distance of 20 μm from the surface,
the steel containing greater than or equal to 0.70 mass % and less than or equal to 1.10 mass % of carbon, greater than or equal to 0.15 mass % and less than or equal to 0.35 mass % of silicon, greater than or equal to 0.30 mass % and less than or equal to 0.60 mass % of manganese, greater than or equal to 1.30 mass % and less than or equal to 1.60 mass % of chromium, less than or equal to 0.50 mass % of vanadium, and less than or equal to 0.50 mass % of molybdenum, and the remainder of iron and inevitable impurities,
the steel of the superficial part having martensite block grains, and precipitates,
the precipitates being nitride based on chromium or vanadium, or carbonitride based on chromium or vanadium,
in the steel of the superficial part, an average grain size of the martensite block grains at a comparison area fraction of 30% being less than or equal to 2.0 μm.

* * * * *